United States Patent
Pace

(10) Patent No.: US 7,508,990 B2
(45) Date of Patent: *Mar. 24, 2009

(54) APPARATUS AND METHOD FOR PROCESSING VIDEO DATA

(75) Inventor: Charles Paul Pace, North Chittenden, VT (US)

(73) Assignee: Euclid Discoveries, LLC, Concord, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/810,759

(22) Filed: Jun. 7, 2007

(65) Prior Publication Data

US 2007/0297645 A1 Dec. 27, 2007

Related U.S. Application Data

(63) Continuation-in-part of application No. 11/396,010, filed on Mar. 31, 2006, now Pat. No. 7,457,472, and a continuation-in-part of application No. 11/336,366, filed on Jan. 20, 2006, now Pat. No. 7,436,981, which is a continuation-in-part of application No. 11/280,625, filed on Nov. 16, 2005, now Pat. No. 7,457,435, which is a continuation-in-part of application No. 11/230,686, filed on Sep. 20, 2005, now Pat. No. 7,426,285, which is a continuation-in-part of application No. 11/191,562, filed on Jul. 28, 2005, now Pat. No. 7,158,680.

(60) Provisional application No. 60/811,890, filed on Jun. 8, 2006, provisional application No. 60/667,532, filed on Mar. 31, 2005, provisional application No. 60/670,951, filed on Apr. 13, 2005, provisional application No. 60/653,810, filed on Feb. 17, 2005, provisional application No. 60/648,094, filed on Jan. 28, 2005, provisional application No. 60/628,819, filed on Nov. 17, 2004, provisional application No. 60/611,878, filed on Sep. 21, 2004, provisional application No. 60/628,861, filed on Nov. 17, 2004, provisional application No. 60/598,085, filed on Jul. 30, 2004.

(51) Int. Cl.
*G06K 9/36* (2006.01)
*G06K 9/00* (2006.01)

(52) U.S. Cl. ..................... 382/236; 382/103
(58) Field of Classification Search ......... 382/115–118, 382/100, 103, 232–253, 173; 348/14.1–14.16, 348/77–78, 699; 375/240.01–240.26
See application file for complete search history.

(56) References Cited

U.S. PATENT DOCUMENTS 5,710,590 A 1/1998 Ichige et al.

(Continued)

FOREIGN PATENT DOCUMENTS

EP 1 124 379 A2 8/2001

(Continued)

OTHER PUBLICATIONS

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511-518.

(Continued)

*Primary Examiner*—Sherali Ishrat
(74) *Attorney, Agent, or Firm*—Hamilton, Brook, Smith & Reynolds, P.C.

(57) ABSTRACT

An apparatus and methods for processing video data are described. The invention provides a representation of video data that can be used to assess agreement between the data and a fitting model for a particular parameterization of the data. This allows the comparison of different parameterization techniques and the selection of the optimum one for continued video processing of the particular data. The representation can be utilized in intermediate form as part of a larger process or as a feedback mechanism for processing video data. When utilized in its intermediate form, the invention can be used in processes for storage, enhancement, refinement, feature extraction, compression, coding, and transmission of video data. The invention serves to extract salient information in a robust and efficient manner while addressing the problems typically associated with video data sources.

21 Claims, 15 Drawing Sheets

U.S. PATENT DOCUMENTS

| | | | |
|---|---|---|---|
| 5,774,591 | A | 6/1998 | Black et al. |
| 5,774,595 | A | 6/1998 | Kim |
| 5,969,755 | A | 10/1999 | Courtney |
| 6,546,117 | B1 | 4/2003 | Sun et al. |
| 6,574,353 | B1 | 6/2003 | Schoepflin et al. |
| 6,611,628 | B1 | 8/2003 | Sekiguchi et al. |
| 6,625,310 | B2 | 9/2003 | Lipton et al. |
| 6,661,004 | B2 | 12/2003 | Aumond et al. |
| 6,711,278 | B1 | 3/2004 | Gu et al. |
| 6,731,799 | B1 | 5/2004 | Sun et al. |
| 6,738,424 | B1 | 5/2004 | Allmen et al. |
| 6,751,354 | B2 | 6/2004 | Foote et al. |
| 6,774,917 | B1 | 8/2004 | Foote et al. |
| 6,912,310 | B1 | 6/2005 | Park et al. |
| 6,925,122 | B2 | 8/2005 | Gorodnichy |
| 6,950,123 | B2 | 9/2005 | Martins |
| 7,043,058 | B2 | 5/2006 | Cornog et al. |
| 7,158,680 | B2 | 1/2007 | Pace |
| 7,164,718 | B2 | 1/2007 | Maziere et al. |
| 2001/0038714 | A1 | 11/2001 | Masumoto et al. |
| 2002/0054047 | A1 | 5/2002 | Toyama et al. |
| 2002/0164068 | A1 | 11/2002 | Yan |
| 2003/0011589 | A1 | 1/2003 | Desbrun et al. |
| 2003/0063778 | A1 | 4/2003 | Rowe et al. |
| 2003/0103647 | A1 | 6/2003 | Rui et al. |
| 2003/0122966 | A1 | 7/2003 | Markman et al. |
| 2003/0194134 | A1 | 10/2003 | Wenzel et al. |
| 2003/0235341 | A1 | 12/2003 | Gokturk et al. |
| 2004/0013286 | A1 | 1/2004 | Viola et al. |
| 2004/0107079 | A1 | 6/2004 | MacAuslan |
| 2004/0135788 | A1 | 7/2004 | Davidson et al. |
| 2004/0246336 | A1 | 12/2004 | Kelly, III et al. |
| 2006/0067585 | A1 | 3/2006 | Pace |
| 2006/0133681 | A1 | 6/2006 | Pace |
| 2006/0177140 | A1 | 8/2006 | Pace et al. |
| 2006/0233448 | A1 | 10/2006 | Pace et al. |
| 2007/0071336 | A1 | 3/2007 | Pace |

FOREIGN PATENT DOCUMENTS

| | | |
|---|---|---|
| WO | WO 99/26415 | 5/1999 |
| WO | WO 00/45600 | 8/2000 |
| WO | WO 02/102084 A1 | 12/2002 |
| WO | WO 2005/055602 A1 | 6/2005 |
| WO | WO 2005/107116 A2 | 11/2005 |

OTHER PUBLICATIONS

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

Reinders, M.J.T., "Facial Feature Localization and Adaptation of a Generic Face Model for Model-Based Coding," *Signal Processing: Image Communication*, No. 7, pp. 57-74 (1995).

Doenges, P. K., "MPEG-4: Audio/Video and Synthetic Graphics/Audio for Mixed Media," *Signal Processing: Image Communication*, No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Jones, M. and P. Viola, "Fast Multi View Face Detection," Mitsubishi Electrical Laboratories, Jul. 2003 (10 pp.).

Viola, P. and M. Jones, "Rapid Object Detection using a Boosted Cascade of Simple Features," Proceedings of the 2001 IEEE Computer Society Conference on Computer Vision and Pattern Recognition, 2001, vol. 1, pp. 511 518.

Gunsel, B. et al., "Content based access to video objects: Temporal segmentation, visual summarization, and feature extraction," Signal Processing, vol. 66, pp. 261 280 (1998).

Piamsa nga, P. and N. Babaguchi, "Motion estimation and detection of complex object by analyzing resampled movements of parts," in Proc. ICIP '04, 1 (365 368), Oct. 2004.

Vidal, R. et al., "Generalized principal component analysis (GPCA)", in Proc. CVPR '03, 1 (1621-628), Jun. 2003.

Vidal, R. and R. Hartley, "Motion segmentation with missing data using PowerFactorization and GPCA," in Proc. CVPR 04, 2 (II-310-316), Jun.-Jul. 2004.

Huang, R. et al., "Sparse representation of images with hybrid linear models," in Proc. ICIP '04, 2(1281 1284) Oct. 2004.

Rong, S. et al., "Efficient spatiotemporal segmentation and video object generation for highway surveillance video," in Proc. IEEE Int'l, Conf. Communications, Circuits and Systems and West Sino Expositions, 1(580 584), Jun. Jul. 2002.

Toklu, C. et al., "Simultaneous Alpha Map Generation and 2 D Mesh Tracking for Multimedia Applications," Proceedings of the International Conference on Image Processing: 1997, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Rehg, J. M. and Witkin, A. P., "Visual Tracking with Deformation Models," Proc. IEEE Int'l. Conf. on Robotics and Automation, pp. 844-850 (Apr. 1991).

Kass, Michael, Andrew Witzin, and Demetri Terzopoulos, "Snakes: Active contour Models," International Journal of Computer Vision (1988).

Global Motion Model Estimation

Consensus Rank Acceptance Test and Processing

Combined Global & Local Normalization

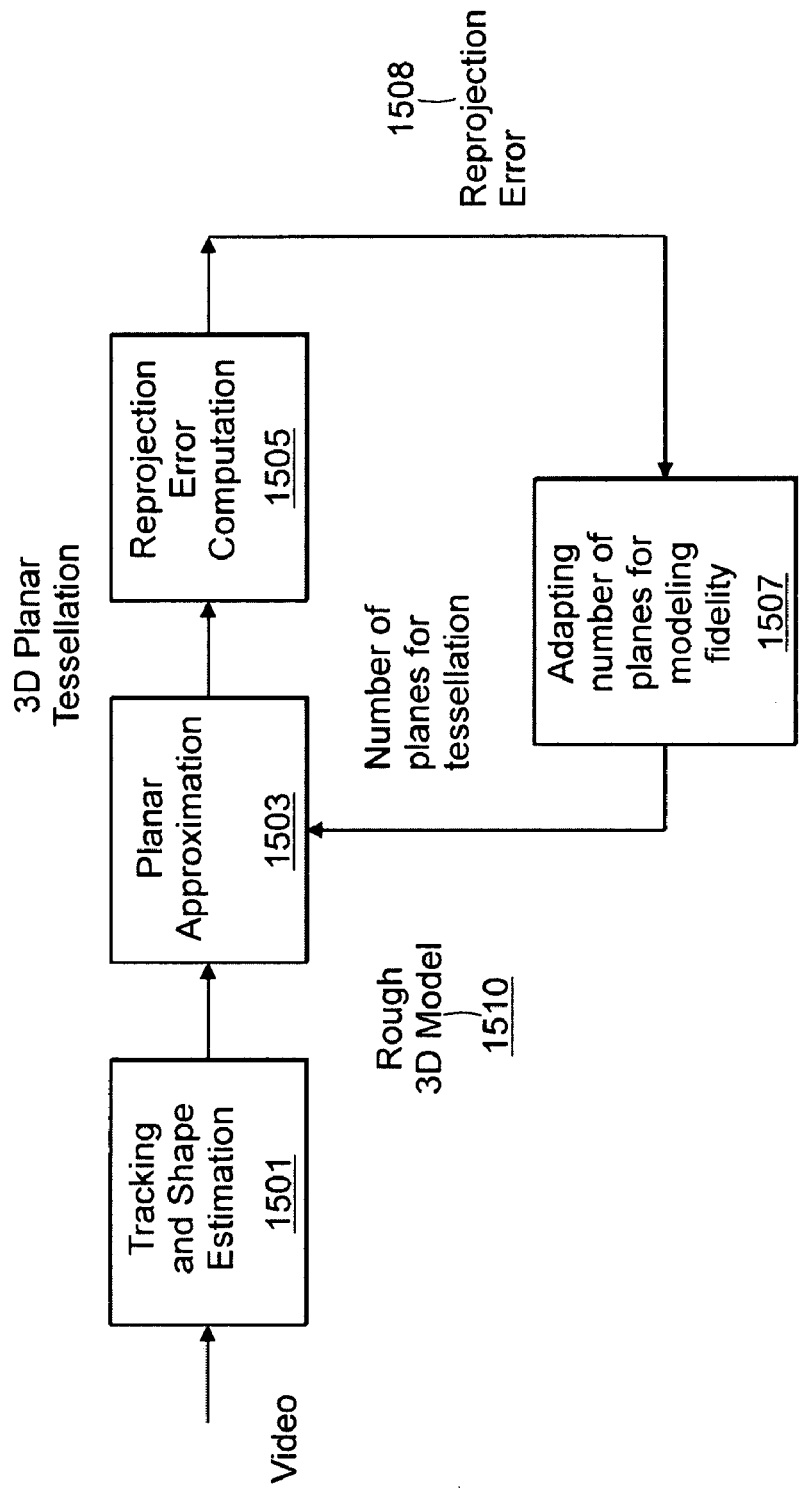

APPARATUS AND METHOD FOR PROCESSING VIDEO DATA

RELATED APPLICATIONS

This application claims the benefits of U.S. Provisional Application 60/811,890 filed Jun. 8, 2006 titled "Apparatus And Method For Processing Video Data". This application is also a CIP of U.S. application Ser. No. 11/396,010, entitled "Apparatus And Method For Processing Video Data", filed Mar. 31, 2006, now U.S. Pat. No. 7,457,472 which claims the benefit of U.S. Provisional Application No. 60/667,532, titled "System And Method For Video Compression Employing Principal Component Analysis," filed Mar. 31, 2005 and U.S. Provisional Application No. 60/670,951, titled "System And Method for Processing Video Data," filed Apr. 13, 2005. The related Ser. No. 11/396,010 application is also a continuation-in-part of U.S. application Ser. No. 11/336,366 filed Jan. 20, 2006 now U.S. Pat. No. 7,436,981 (claims the benefit of U.S. Provisional Application 60/653,810, filed Feb. 17, 2005 and U.S. Provisional Application 60/648,094, filed Jan. 28, 2005), which is a continuation-in-part of U.S. application Ser. No. 11/280,625 filed Nov. 16, 2005 now U.S. Pat. No. 7,457,435 (claims benefits of U.S. Provisional Application No. 60/628,819, filed Nov. 17, 2004), which is a continuation-in-part of U.S. application Ser. No. 11/230,686, filed Sep. 20, 2005 now U.S. Pat. No. 7,426,285 (claims benefit of U.S. Provisional Application No. 60/611,878, filed Sep. 21, 2004 and U.S. Provisional 60/628,861 filed Nov. 17, 2004), which is a continuation-in-part of U.S. application Ser. No. 11/191,562, filed Jul. 28, 2005 now U.S. Pat. No. 7,158,680 which claims the benefit of U.S. Provisional Application No. 60/598,085, filed Jul. 30, 2004. Each of the foregoing applications is incorporated herein by reference in its entirety.

FIELD OF THE INVENTION

The present invention is generally related to the field of digital signal processing, and more particularly, to computer apparatus and computer-implemented methods for the efficient representation and processing of signal or image data, and most particularly, video data.

DESCRIPTION OF THE PRIOR ART

The general system description of the prior art in which the current invention resides can be expressed as in FIG. 1. Here a block diagram displays the typical prior art video processing system. Such systems typically include the following stages: an input stage 102, a processing stage 104, an output stage 106, and one or more data storage mechanism(s) 108.

The input stage 102 may include elements such as camera sensors, camera sensor arrays, range finding sensors, or a means of retrieving data from a storage mechanism. The input stage provides video data representing time correlated sequences of man-made and/or naturally occurring phenomena. The salient component of the data may be masked or contaminated by noise or other unwanted signals.

The video data, in the form of a data stream, array, or packet, may be presented to the processing stage 104 directly from input stage 102 or through an intermediate storage element 108 in accordance with a predefined transfer protocol. The processing stage 104 may take the form of dedicated analog or digital devices, or programmable devices such as central processing units (CPUs), digital signal processors (DSPs), or field programmable gate arrays (FPGAs) to execute a desired set of video data processing operations. The processing stage 104 typically includes one or more CODECs (COder/DECcoders).

Output stage 106 produces a signal, display, or other response which is capable of affecting a user or external apparatus. Typically, an output device is employed to generate an indicator signal, a display, a hardcopy, a representation of processed data in storage, or to initiate transmission of data to a remote site. It may also be employed to provide an intermediate signal or control parameter for use in subsequent processing operations.

Storage is presented as an optional element in this system. When employed, storage element 108 may be either non-volatile, such as read-only storage media, or volatile, such as dynamic random access memory (RAM). It is not uncommon for a single video processing system to include several types of storage elements, with the elements having various relationships to the input, processing, and output stages. Examples of such storage elements include input buffers, output buffers, and processing caches.

The primary objective of the video processing system in FIG. 1 is to process input data to produce an output which is meaningful for a specific application. In order to accomplish this goal, a variety of processing operations may be utilized, including noise reduction or cancellation, feature extraction, object segmentation and/or normalization, data categorization, event detection, editing, data selection, data re-coding, and transcoding.

Many data sources that produce poorly constrained data are of importance to people, especially sound and visual images. In most cases the essential characteristics of these source signals adversely impact the goal of efficient data processing. The intrinsic variability of the source data is an obstacle to processing the data in a reliable and efficient manner without introducing errors arising from naïve empirical and heuristic methods used in deriving engineering assumptions. This variability is lessened for applications when the input data are naturally or deliberately constrained into narrowly defined characteristic sets (such as a limited set of symbol values or a narrow bandwidth). These constraints all too often result in processing techniques that are of low commercial value.

The design of a signal processing system is influenced by the intended use of the system and the expected characteristics of the source signal used as an input. In most cases, the performance efficiency required will also be a significant design factor. Performance efficiency, in turn, is affected by the amount of data to be processed compared with the data storage available as well as the computational complexity of the application compared with the computing power available.

Conventional video processing methods suffer from a number of inefficiencies which are manifested in the form of slow data communication speeds, large storage requirements, and disturbing perceptual artifacts. These can be serious problems because of the variety of ways people desire to use and manipulate video data and because of the innate sensitivity people have for some forms of visual information.

An "optimal" video processing system is efficient, reliable, and robust in performing a desired set of processing operations. Such operations may include the storage, transmission, display, compression, editing, encryption, enhancement, categorization, feature detection, and recognition of the data. Secondary operations may include integration of such processed data with other information sources. Equally important, in the case of a video processing system, the outputs should be compatible with human vision by avoiding the introduction of perceptual artifacts.

A video processing system may be described as "robust" if its speed, efficiency, and quality do not depend strongly on the specifics of any particular characteristics of the input data. Robustness also is related to the ability to perform operations when some of the input is erroneous. Many video processing systems fail to be robust enough to allow for general classes of applications—providing only application to the same narrowly constrained data that was used in the development of the system.

Salient information can be lost in the discretization of a continuous-valued data source due to the sampling rate of the input element not matching the signal characteristics of the sensed phenomena. Also, there is loss when the signal's strength exceeds the sensor's limits, resulting in saturation. Similarly, information is lost when the precision of input data is reduced as happens in any quantization process when the full range of values in the input data is represented by a set of discrete values, thereby reducing the precision of the data representation.

Ensemble variability refers to any unpredictability in a class of data or information sources. Data representative of visual information has a very large degree of ensemble variability because visual information is typically unconstrained. Visual data may represent any spatial array sequence or spatio-temporal sequence that can be formed by light incident on a sensor array.

In modeling visual phenomena, video processors generally impose some set of constraints and/or structure on the manner in which the data is represented or interpreted. As a result, such methods can introduce systematic errors which would impact the quality of the output, the confidence with which the output may be regarded, and the type of subsequent processing tasks that can reliably be performed on the data.

Quantization methods reduce the precision of data in the video frames while attempting to retain the statistical variation of that data. Typically, the video data is analyzed such that the distributions of data values are collected into probability distributions. There are also methods that project the data into phase space in order to characterize the data as a mixture of spatial frequencies, thereby allowing precision reduction to be diffused in a less objectionable manner. When utilized heavily, these quantization methods often result in perceptually implausible colors and can induce abrupt pixilation in originally smooth areas of the video frame.

Differential coding is also typically used to capitalize on the local spatial similarity of data. Data in one part of the frame tend to be clustered around similar data in that frame, and also in a similar position in subsequent frames. Representing the data in terms of its spatially adjacent data can then be combined with quantization and the net result is that, for a given precision, representing the differences is more accurate than using the absolute values of the data. This assumption works well when the spectral resolution of the original video data is limited, such as in black and white video, or low-color video. As the spectral resolution of the video increases, the assumption of similarity breaks down significantly. The breakdown is due to the inability to selectively preserve the precision of the video data.

Residual coding is similar to differential encoding in that the error of the representation is further differentially encoded in order to restore the precision of the original data to a desired level of accuracy.

Variations of these methods attempt to transform the video data into alternate representations that expose data correlations in spatial phase and scale. Once the video data has been transformed in these ways, quantization and differential coding methods can then be applied to the transformed data resulting in an increase in the preservation of the salient image features. Two of the most prevalent of these transform video compression techniques are the discrete cosine transform (DCT) and discrete wavelet transform (DWT). Error in the DCT transform manifests in a wide variation of video data values, and therefore, the DCT is typically used on blocks of video data in order to localize these false correlations. The artifacts from this localization often appear along the border of the blocks. For the DWT, more complex artifacts happen when there is a mismatch between the basis function and certain textures, and this causes a blurring effect. To counteract the negative effects of DCT and DWT, the precision of the representation is increased to lower distortion at the cost of precious bandwidth.

SUMMARY OF THE INVENTION

The present invention is a computer-implemented video processing method that provides both computational and analytical advantages over existing state-of-the-art methods. The principle inventive method is the integration of a linear decompositional method, a spatial segmentation method, and a spatial normalization method. Spatially constraining video data greatly increases the robustness and applicability of linear decompositional methods. Additionally, spatial segmentation of the data corresponding to the spatial normalization, can further serve to increase the benefits derived from spatial normalization alone.

In particular, the present invention provides a means by which signal data can be efficiently processed into one or more beneficial representations. The present invention is efficient at processing many commonly occurring data sets and is particularly efficient at processing video and image data. The inventive method analyzes the data and provides one or more concise representations of that data to facilitate its processing and encoding. Each new, more concise data representation allows reduction in computational processing, transmission bandwidth, and storage requirements for many applications, including, but not limited to: encoding, compression, transmission, analysis, storage, and display of the video data.

The invention includes methods for identification and extraction of salient components of the video data, allowing a prioritization in the processing and representation of the data. Noise and other unwanted parts of the signal are identified as lower priority so that further processing can be focused on analyzing and representing the higher priority parts of the video signal. As a result, the video signal is represented more concisely than was previously possible. And the loss in accuracy is concentrated in the parts of the video signal that are perceptually unimportant.

In one embodiment, PCA (Principal Component Analysis) or similar linear decomposition is employed for certain object (e.g. a face) detection and local deformation of the object. The PCA further serves as an empirical transform of the normalized video data representing object appearance. After salient object segmentation, the normalization method tracks a 2-dimensional mesh and allows the mesh to deform. Object appearance from different frames is normalized along one plane.

In one embodiment, a Proxy Wavelet Compressor is utilized for progressive basis encoding of the subject video data.

The invention method compresses training frames and the normalized frames of video data of interest.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 15 is a block diagram of an adaptive incremental modeler of the present invention.

DETAILED DESCRIPTION OF THE INVENTION

A description of example embodiments of the invention follows. In video signal data, frames of video are assembled into a sequence of images usually depicting a three dimensional scene as projected, imaged, onto a two dimensional imaging surface. Each frame, or image, is composed of picture elements (pels) that represent an imaging sensor response to the sampled signal. Often, the sampled signal corresponds to some reflected, refracted, or emitted energy, (e.g. electromagnetic, acoustic, etc) sampled by a two dimensional sensor array. A successive sequential sampling results in a spatiotemporal data stream with two spatial dimensions per frame and a temporal dimension corresponding to the frame's order in the video sequence.

Figure 1:
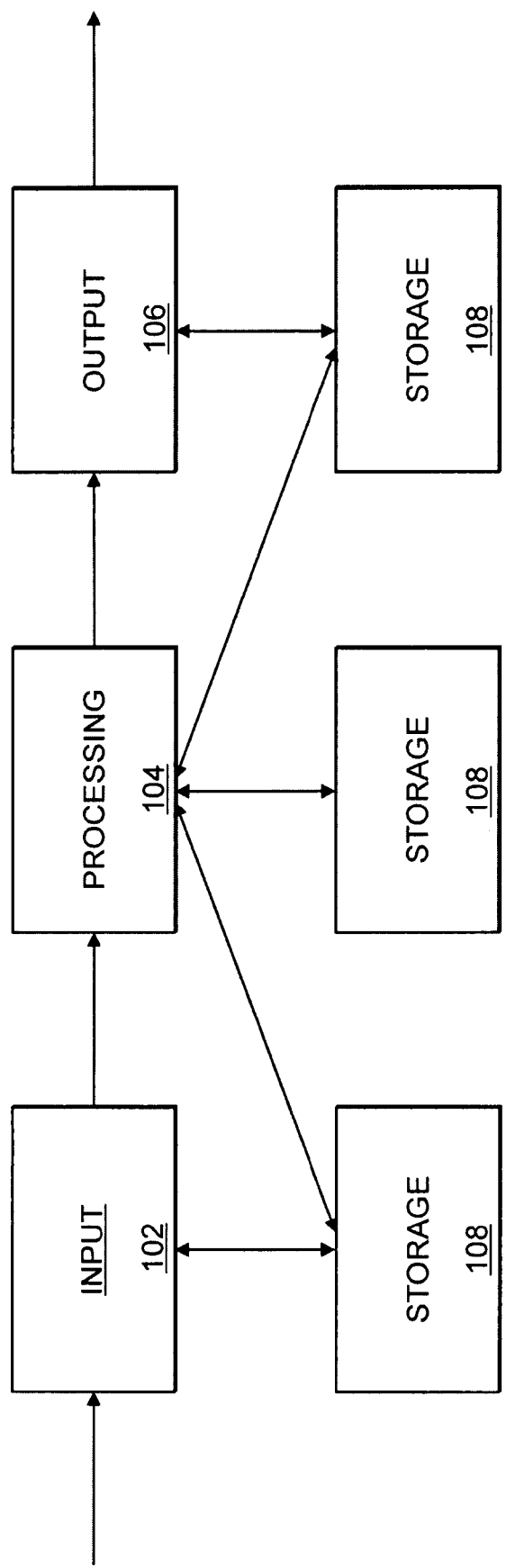
FIG. 1 is a block diagram illustrating a prior art video processing system.
Figure 2:
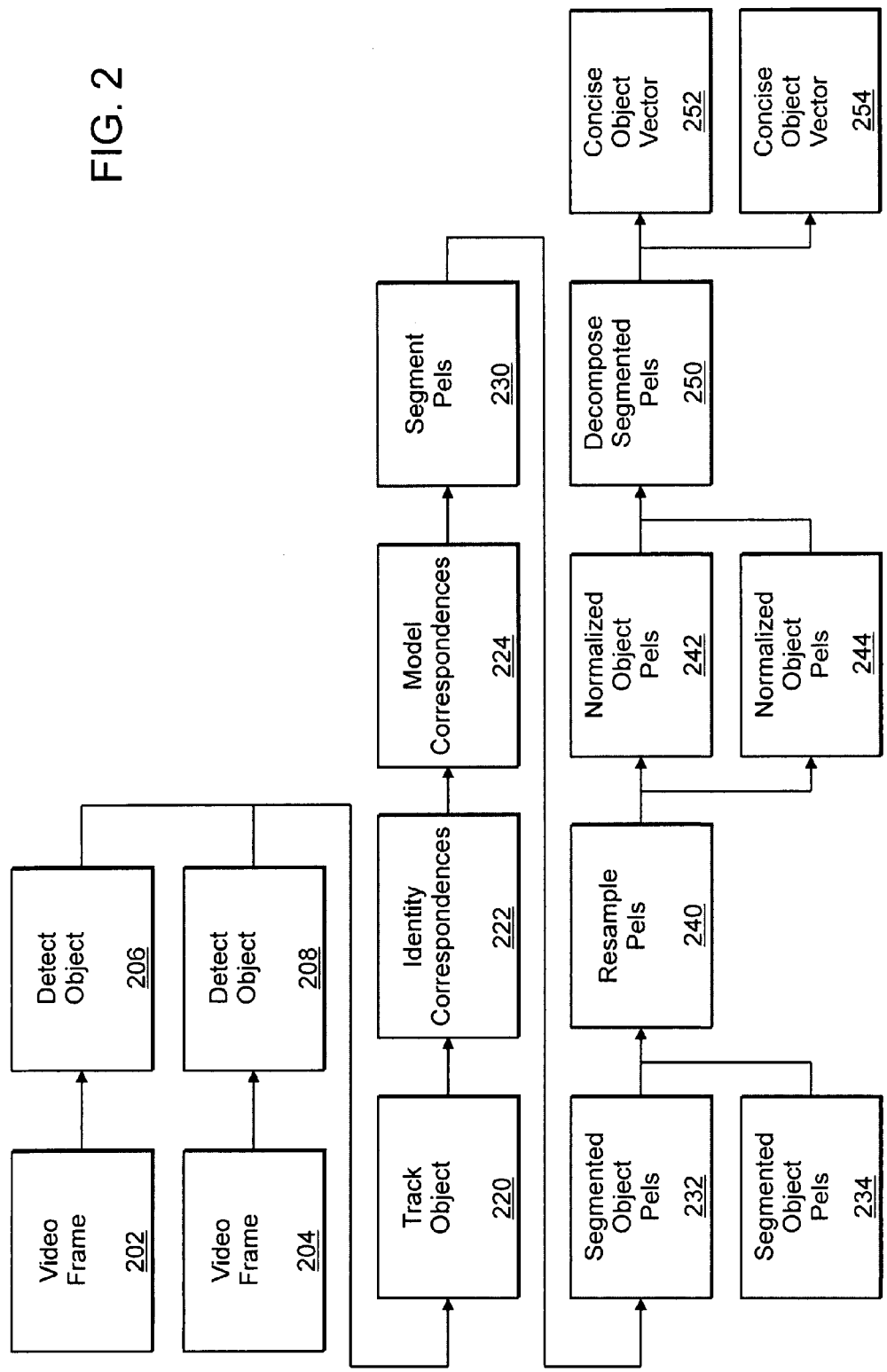
FIG. 2 is a block diagram providing an overview of the invention that shows the major modules for processing video.

The present invention as illustrated in FIG. 2 analyzes signal data and identifies the salient components. When the signal is comprised of video data, analysis of the spatiotemporal stream reveals salient components that are often specific objects, such as faces. The identification process qualifies the existence and significance of the salient components, and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy.

In one embodiment of the invention, a foreground object is detected and tracked. The object's pels are identified and segmented from each frame of the video. The block-based motion estimation is applied to the segmented object in multiple frames. These motion estimates are then integrated into a higher order motion model. The motion model is employed to warp instances of the object to a common spatial configuration. For certain data, in this configuration, more of the features of the object are aligned. This normalization allows the linear decomposition of the values of the object's pels over multiple frames to be compactly represented. The salient information pertaining to the appearance of the object is contained in this compact representation. A preferred embodiment of the present invention details the linear decomposition of a foreground video object. The object is normalized spatially, thereby yielding a compact linear appearance model. A further preferred embodiment additionally segments the foreground object from the background of the video frame prior to spatial normalization.

A preferred embodiment of the invention applies the present invention to a video of a person speaking into a camera while undergoing a small amount of motion.

A preferred embodiment of the invention applies the present invention to any object in a video that can be represented well through spatial transformations.

A preferred embodiment of the invention specifically employs block-based motion estimation to determine finite differences between two or more frames of video. A higher order motion model is factored from the finite differences in order to provide a more effective linear decomposition.

Detection & Tracking (C1)

It is known in the art to detect an object in a frame and to track that object through a predetermined number of later frames. Among the algorithms and programs that can be used to perform the object detection function is the Viola/Jones: P. Viola and M. Jones, "Robust Real-time Object Detection," in Proc. 2nd Int'l Workshop on Statistical and Computational Theories of Vision—Modeling, Learning, Computing and Sampling, Vancouver, Canada, July 2001. Likewise, there are a number of algorithms and programs that can be used to track the detected object through successive frames. An example includes: C. Edwards, C. Taylor, and T. Cootes. "Learning to identify and track faces in an image sequence." Proc. Int'l Conf. Auto. Face and Gesture Recognition, pages 260-265, 1998.

The result of the object detection process is a data set that specifies the general position of the center of the object in the frame and an indication as to the scale (size) of the object. The result of the tracking process is a data set that represents a temporal label for the object and assures that to a certain level of probability the object detected in the successive frames is the same object.

The object detection and tracking algorithm may be applied to a single object in the frames or to two or more objects in the frames.

It is also known to track one or more features of the detected object in the group of sequential frames. If the object is a human face, for example, the features could be an eye or a nose. In one technique, a feature is represented by the intersection of "lines" that can loosely be described as a "corner." Preferably, "corners" that are both strong and spatially disparate from each other are selected as features. The features may be identified through a spatial intensity field gradient analysis. Employing a hierarchical multi-resolution estimation of the optical flow allows the determination of the translational displacement of the features in successive frames. M. J. Black and Y. Yacoob. "Tracking and recognizing rigid and non-rigid facial motions using local parametric models of image motions." In Proceedings of the International Conference on Computer Vision, pages 374-381, Boston, Mass., June 1995 is an example of an algorithm that uses this technique to track features.

Once the constituent salient components of the signal have been determined, these components may be retained, and all other signal components may be diminished or removed. The process of detecting the salient component is shown in FIG. 2, where the Video Frame (202) is processed by one or more Detect Object (206, 208) processes, resulting in one or more objects being identified, and subsequently tracked. The retained components (identified objects) represent one intermediate form of the video data. This intermediate data can then be encoded using techniques that are typically not available to existing video processing methods. As the intermediate data exists in several forms, standard video encoding techniques can also be used to encode several of these intermediate forms. For each instance, the present invention determines and then employs the encoding technique that is most efficient.

In one embodiment, a saliency analysis process detects and classifies salient signal modes. One embodiment of this process employs a combination of spatial filters specifically designed to generate a response signal whose strength is relative to the detected saliency of an object in the video frame. The classifier is applied at differing spatial scales and in different positions of the video frame. The strength of the response from the classifier indicates the likelihood of the presence of a salient signal mode. When centered over a strongly salient object, the process classifies it with a correspondingly strong response. The detection of the salient signal mode distinguishes the present invention by enabling the subsequent processing and analysis on the salient information in the video sequence.

Given the detection location of a salient signal mode in one or more frames of video, the present invention analyzes the salient signal mode's invariant features. Additionally, the invention analyzes the residual of the signal, the "less-salient" signal modes, for invariant features. Identification of invariant features provides a basis for reducing redundant information and segmenting (i.e. separating) signal modes.

Feature Point Tracking (C7)

In one embodiment of the present invention, spatial positions in one or more frames are determined through spatial intensity field gradient analysis. These features correspond to some intersection of "lines" which can be described loosely as a "corner". Such an embodiment further selects a set of such corners that are both strong corners and spatially disparate from each other, herein referred to as the feature points. Further, employing a hierarchical multi-resolution estimation of the optical flow allows the determination of the translational displacement of the feature points over time.

In FIG. 2, the Track Object (220) process is shown to pull together the detection instances from the Detect Object processes (206, 208) and further Identify Correspondences (222) of features of one or more of the detected objects over a multitude of Video Frames (202, 204).

A non-limiting embodiment of feature tracking can be employed such that the features are used to qualify a more regular gradient analysis method such as block-based motion estimation.

Another embodiment anticipates the prediction of motion estimates based on feature tracking.

Object-Based Detection and Tracking (C1)

In one non-limiting embodiment of the current invention, a robust object classifier is employed to track faces in frames of video. Such a classifier is based on a cascaded response to oriented edges that has been trained on faces. In this classifier, the edges are defined as a set of basic Haar features and the rotation of those features by 45 degrees. The cascaded classifier is a variant of the AdaBoost algorithm. Additionally, response calculations can be optimized through the use of summed area tables.

Local Registration

Registration involves the assignment of correspondences between elements of identified objects in two or more video frames. These correspondences become the basis for modeling the spatial relationships between video data at temporally distinct points in the video data.

Various non-limiting means of registration are described for the present invention in order to illustrate specific embodiments and their associated reductions to practice in terms of well known algorithms and inventive derivatives of those algorithms.

Figure 3:
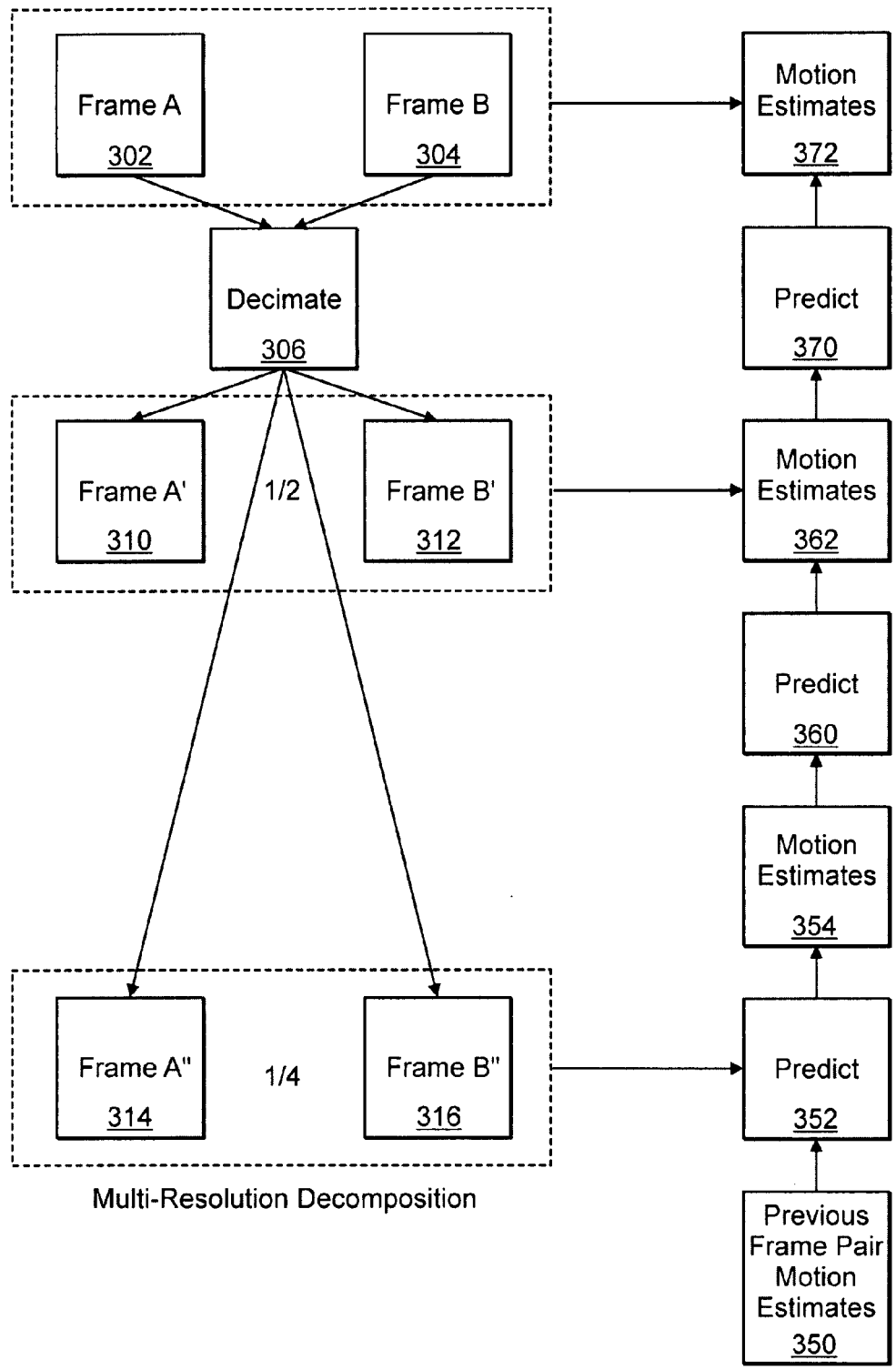
FIG. 3 is a block diagram illustrating the motion estimation method of the invention.

One means of modeling the apparent optical flow in a spatio-temporal sequence can be achieved through generation of a finite difference field from two or more frames of the video data. An optical flow field can be sparsely estimated if the correspondences conform to certain constancy constraints in both a spatial and an intensity sense. As shown in FIG. 3, a Frame (302 or 304) is sub-sampled spatially, possibly through a decimation process (306), or some other sub-sampling process (e.g. low pass filter). Spatially reduced image frames 310, 312 result. These spatially reduced images (310, 312) can be further sub-sampled as well resulting in frames 314, 316 for example Each sampled/sub-sampled level of frames 302, 304, 310, 312, 314, 316 is processed to determine correspondences of features of detected objects across frames. This is accomplished by respective motion estimates 350, 354, 362, 372 and prediction 352, 360, 370, steps of FIG. 3 detailed next.

Diamond Search

Given a non-overlapping partitioning of a frame of video into blocks, the motion estimation process searches the previous frame of video for a match to each block. The full search block-based (FSBB) motion estimation finds the position in the previous frame of video that has the lowest error when compared with a block in the current frame. Performing FSBB can be quite expensive computationally, and often does not yield a better match than other motion estimation schemes based on the assumption of localized motion. Diamond search block-based (DSBB) gradient descent motion estimation is a common alternative to FSBB that uses a diamond shaped search pattern of various sizes to iteratively traverse an error gradient toward the best match for a block.

In one embodiment of the present invention, DSBB is employed in the analysis of the image gradient field between one or more frames of video in order to generate finite differences whose values are later factored into higher order motion models.

One skilled in the art is aware that block-based motion estimation can be seen as the equivalent of an analysis of vertices of a regular mesh.

Mesh-Based Motion Estimation

Mesh based prediction uses a geometric mesh of vertices connected by edges to delineate discrete regions of the video frame and then subsequently predict the deformation and movement of those regions in subsequent frames through deformation models controlled by the position of the mesh vertices. As the vertices are moved, the pels within the regions defined by the vertices are moved as well to predict the current frame. The relative movement and resulting approximation of the original pel values are performed through some interpolation method that associates the pel position with that of the vertices in the vicinity of that pel. The additional modeling of scaling and rotation as compared to pure translation can produce a more accurate prediction of the frame's pels when such motions are present in the video signal.

Generally, mesh models can be defined as being regular or adaptive. Regular mesh models are laid out without considering the underlying signal characteristics while adaptive methods attempt to spatially arrange vertices and edges relative to features of the underlying video signal.

Regular mesh representations provide a means by which the motion, or equivalently the deformations inherent in the motion, can be predicted or modeled, provided the imaged objects in the video have spatial discontinuities that more correspond to edges in the mesh.

Adaptive meshes are formed with substantially greater consideration for the features of the underlying video signal than regular meshes. Additionally, the adaptive nature of such a mesh may allow for various refinements of the mesh over time. The present invention adjusts the vertex search order using homogeneity criteria in order to perform mesh, and equivalently pel, registration. Vertices that are associated spatially with heterogeneous intensity gradients are motion estimated before those having a more homogenous gradient.

In one embodiment, the vertex motion estimation of the mesh is additionally prioritized through a spatial flood-filling of motion estimation for vertices of equivalent or near equivalent homogeneity.

In a preferred embodiment, the original mesh spatial configuration and final mesh configuration are mapped to each other on a facet level by filling a mapping image with facet identifiers using standard graphical filling routines. The affine transformations associated with each triangle can be quickly looked up in a transform table, and pel (and sub-pel) positions associated with a facet in one mesh can quickly be transformed into a position in the other mesh.

In a preferred embodiment, a preliminary motion estimation is made for vertices in order to assess the residual error associated with each motion estimation match. This preliminary estimation is additionally used to prioritize the motion estimation order of the vertices. The advantage of such a residual error analysis is that motion estimates that are associated with less distortion will result in maintaining a more plausible mesh topology.

In a preferred embodiment, mesh vertex motion estimates are scaled down to some limited range and multiple motion estimations are made through several iterations in order to allow the mesh to approach a more globally optimal and topologically correct solution.

In a preferred embodiment, block-based motion estimates utilizing a rectangular tile neighborhood centered on each vertex is used to determine the vertex displacement in deference to an interpolated polygon neighborhood. In addition to avoiding a spatial interpolation and warping of pels for error gradient descent, this technique also allows parallel computation of motion estimates.

Phase-Based Motion Estimation

In the prior art, block-based motion estimation is typically implemented as a spatial search resulting in one or more spatial matches. Phase-based normalized cross correlation (PNCC) as illustrated in FIG. 3 transforms a block from the current frame 304, 312, 316 and the previous frame 302, 310, 314 into "phase space" and finds the cross correlation of those two blocks. The cross correlation is represented as a field of values whose positions correspond to the 'phase shifts' of edges between the two blocks. These positions are isolated through thresholding and then transformed back into spatial coordinates. The spatial coordinates are distinct edge displacements, and correspond to motion vectors. Advantages of the PNCC include contrast masking which allows the tolerance of gain/exposure adjustment in the video stream. Also, the PNCC allows results from a single step that might take many iterations from a spatially based motion estimator. Further, the motion estimates 350, 354, 362, 372 are sub-pixel accurate.

One embodiment of the invention utilizes PNCC in the analysis of the image gradient field between one or more frames of video in order to generate finite differences whose values are later factored into higher order motion models (at 352, 360, 370). Once object feature correspondences are identified 222, then a model of the correspondences is made 224 as discussed next.

Global Registration

In a preferred embodiment, the present invention generates a correspondence model (224, FIG. 2) by using the relationships between corresponding elements of a detected object in two or more frames of video. These relationships are analyzed by factoring one or more linear models from a field of finite difference estimations. The term field refers to each finite difference having a spatial position. These finite differences may be the translational displacements of corresponding object features in disparate frames of video described in the Detection and Tracking section. The field from which such sampling occurs is referred to herein as the general population of finite differences. The described method employs robust estimation similar to that of the RANSAC algorithm as described in: M. A. Fischler, R. C. Bolles. "Random Sample Consensus: A Paradigm for Model Fitting with Applications to Image Analysis and Automated Cartography." Comm. of the ACM, Vol 24, pp 381-395, 1981.

Figure 4:
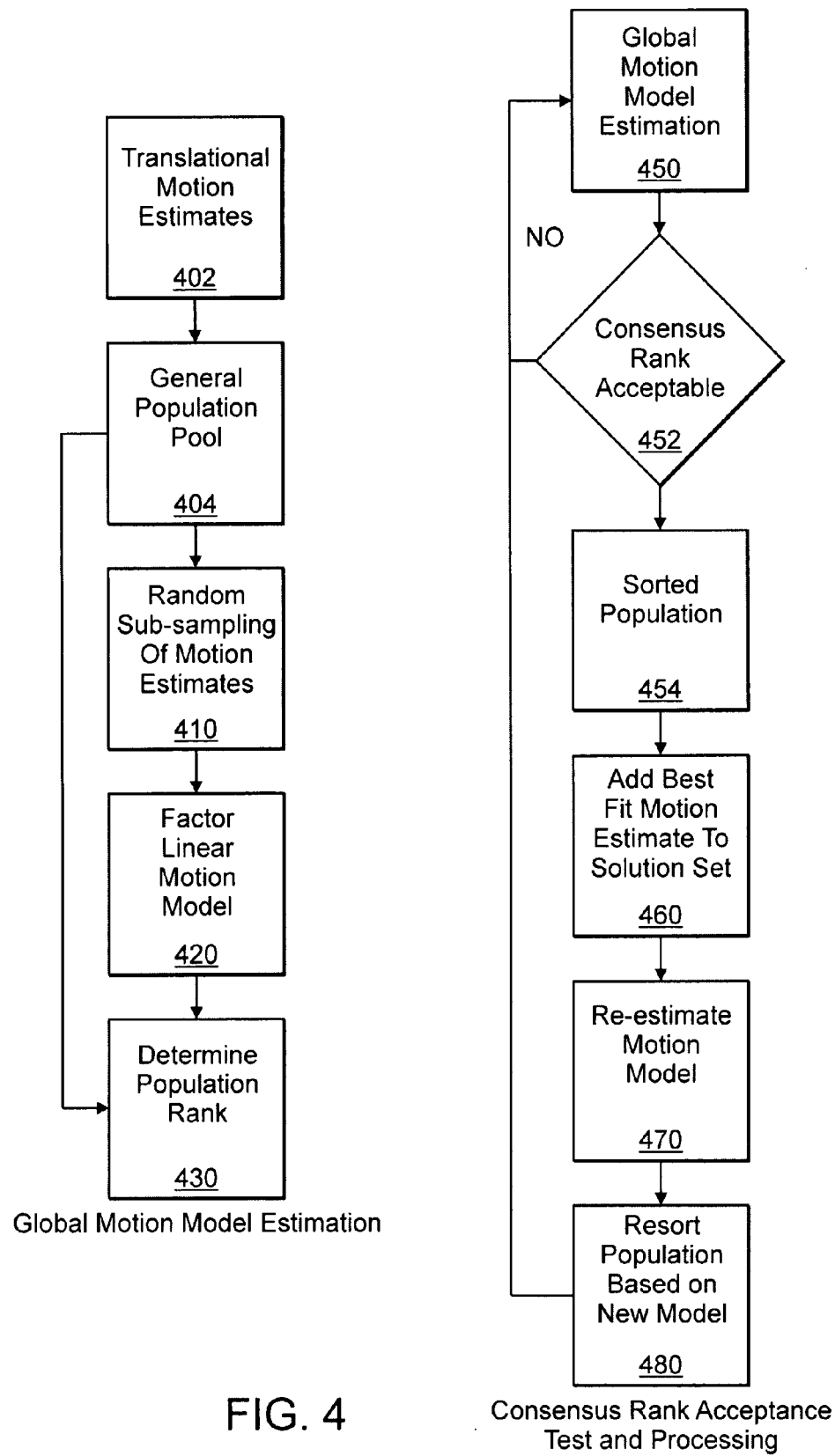
FIG. 4 is a block diagram illustrating the global registration method of the invention.

As shown in FIG. 4, the finite differences, in the case of global motion modeling, are Translational Motion Estimates (402) that are collected into a General Population Pool (404) which is iteratively processed by a Random Sampling of those Motion Estimates (410) and a linear model is factored out (420) of those samples. The Results (430) are then used to adjust the population (404) to better clarify the linear model through the exclusion of outliers to the model, as found through the random process. The present invention is able to utilize one or more robust estimators; one of which may be the RANSAC robust estimation process. Robust estimators are well documented in the prior art.

In one embodiment of the linear model estimation algorithm, the motion model estimator is based on a linear least squares solution. This dependency causes the estimator to be thrown off by outlier data. Based on RANSAC, the disclosed method is a robust method of countering the effect of outliers through the iterative estimation of subsets of the data, probing for a motion model that will describe a significant subset of the data. The model generated by each probe is tested for the percentage of the data that it represents. If there are a sufficient number of iterations, then a model will be found that fits the largest subset of the data. A description of how to perform such robust linear least squares regression is described in: R. Dutter and P. J. Huber. "Numerical methods for the nonlinear robust regression problem." Journal of Statistical and Computational Simulation, 13:79-113, 1981.

As conceived and illustrated in FIG. 4, the present invention discloses innovations beyond the RANSAC algorithm in the form of alterations of the algorithm that involve the initial sampling of finite differences (samples) and least squares estimation of a linear model. Synthesis error is assessed for all samples in the general population using the solved linear model. A rank is assigned to the linear model based on the number of samples whose residual conforms to a preset threshold. This rank is considered the "candidate consensus".

The initial sampling, solving, and ranking are performed iteratively until termination criteria are satisfied. Once the criteria are satisfied, the linear model with the greatest rank is considered to be the final consensus of the population.

An option refinement step involves iteratively analyzing subsets of samples in the order of best fit to the candidate model, and increasing the subset size until adding one more sample would exceed a residual error threshold for the whole subset.

As shown in FIG. 4, The Global Model Estimation process (450) is iterated until the Consensus Rank Acceptability test is satisfied (452). When the rank has not been achieved, the population of finite differences is sorted (454) relative to the discovered model in an effort to reveal the linear model. The best (highest rank) motion model is added to a solution set in process 460. Then the model is re-estimated in process 470. Upon completion, the population 404 is re-sorted 480 based on the new/re-estimated model.

The described non-limiting embodiments of the invention can be further generalized as a general method of sampling a vector space, described above as a field of finite difference vectors, in order to determine subspace manifolds in another parameter vector space that would correspond to a particular linear model.

A further result of the global registration process is that the difference between this and the local registration process yields a local registration residual. This residual is the error of the global model in approximating the local model.

According to the foregoing, embodiments of the previous invention preferably generate a correspondence model 224 using a robust-estimator for the solution of a multi-dimensional projective motion model, and integrate relationships found between corresponding object elements across video frames to form a model of global motion.

Normalization (C1)

Normalization refers to the resampling of spatial intensity fields towards a standard, or common, spatial configuration. When these relative spatial configurations are invertible spatial transformations between such configurations the resampling and accompanying interpolation of pels are also invertible up to a topological limit. The normalization method of the present invention is illustrated in FIG. 5 and operates on the pel level (i.e. resamples pels and subpels).

Figure 5:
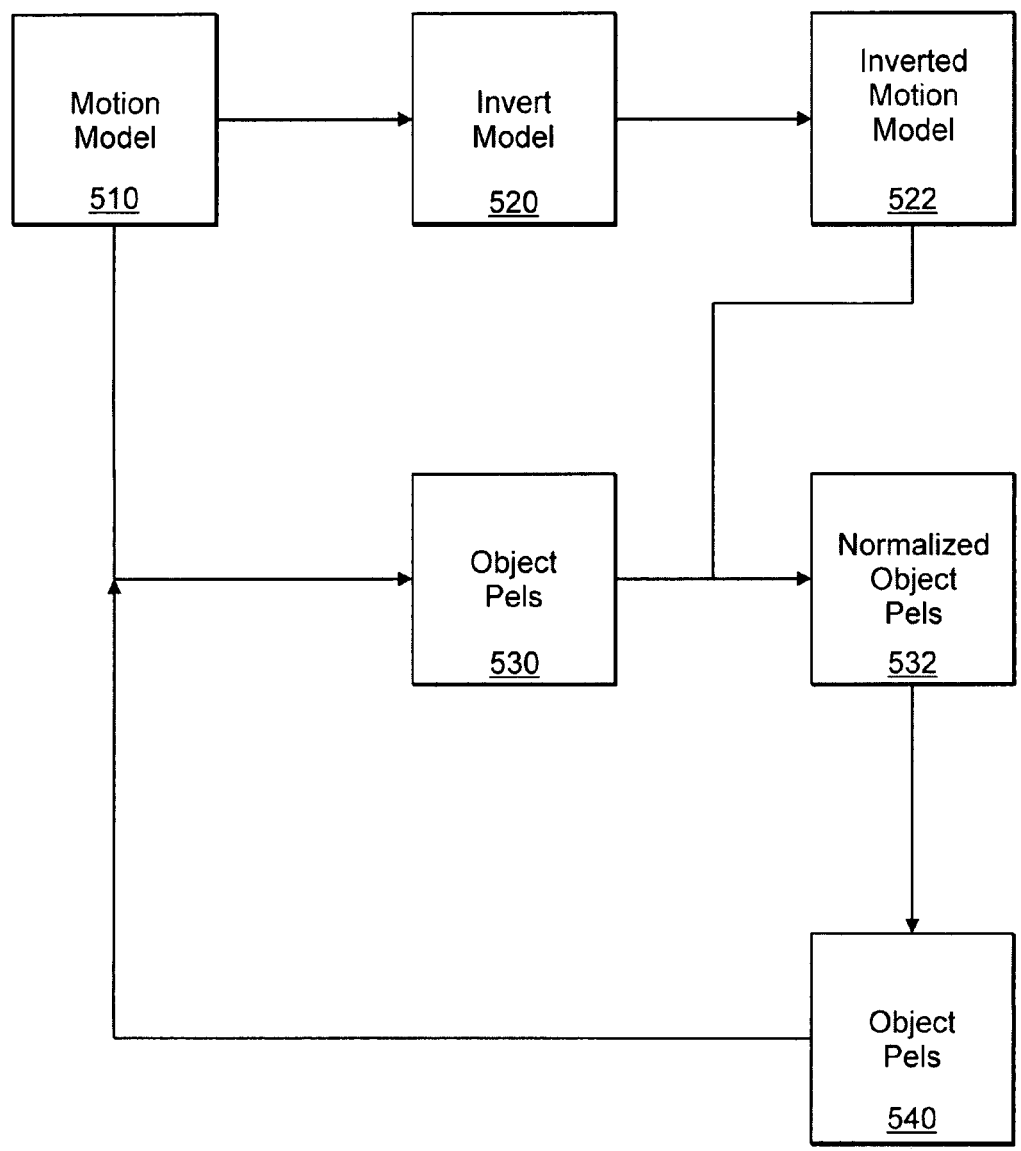
FIG. 5 is a block diagram illustrating the normalization method of the invention.

In FIG. 5, given a motion estimation model 510, the normalization process inverts (520) the spatial transformation between relative spatial configurations of the motion model 510. An inverted motion model 522 results. Using the inverted motion model 522, object pels 530 from the motion model 510 are resampled at 532 resulting in interpolation of accompanying pels. In the preferred embodiment, the resampling filters or otherwise factors out any variation associated with structure, deformation, pose and illumination of spatial regions across multiples frames of video data. The remaining variation is considered to be the "appearance" of the imaged object.

When more than two spatial intensity fields are normalized, increased computational efficiency may be achieved by preserving intermediate normalization calculations.

Spatial transformation models used to resample images for the purpose of registration, or equivalently for normalization, include global and local models. Global models are of increasing order from translational to projective. Local models are finite differences that imply an interpolant on a neighborhood of pels as determined basically by a block or more complexly by a piece-wise linear mesh.

Interpolation of original intensity fields to normalized intensity field increases linearity of PCA appearance models based on subsets of the intensity field.

As shown in FIG. 2, after object pels are segmented (230) from the image data/frames according to model correspondences (224) as discussed later, the object pels and subpels (232,234) can be re-sampled (240). The resampling 240 at the pel and sub-pel level yields a normalized version of the object pels and subpels (242, 244).

Mesh-Based Normalization

A preferred embodiment of the present invention tessellates the feature points into a triangle based mesh, the vertices of the mesh are tracked, and the relative positions of each triangle's vertices are used to estimate the three-dimensional surface normal for the plane coincident with those three vertices. When the surface normal is coincident with the projective axis of the camera, the imaged pels can provide a least-distorted rendering of the object corresponding to the triangle. Creating a normalized image that tends to favor the orthogonal surface normal can produce a pel preserving intermediate data type that will increase the linearity of subsequent appearance-based PCA (Principal Component Analysis) models. Other linear decomposition besides PCA are suitable.

Another embodiment utilizes conventional block-based motion estimation to implicitly model a global motion model. In one, non-limiting embodiment, the method factors a global affine motion model from the motion vectors described by the conventional block-based motion estimation/prediction.

Figure 9:
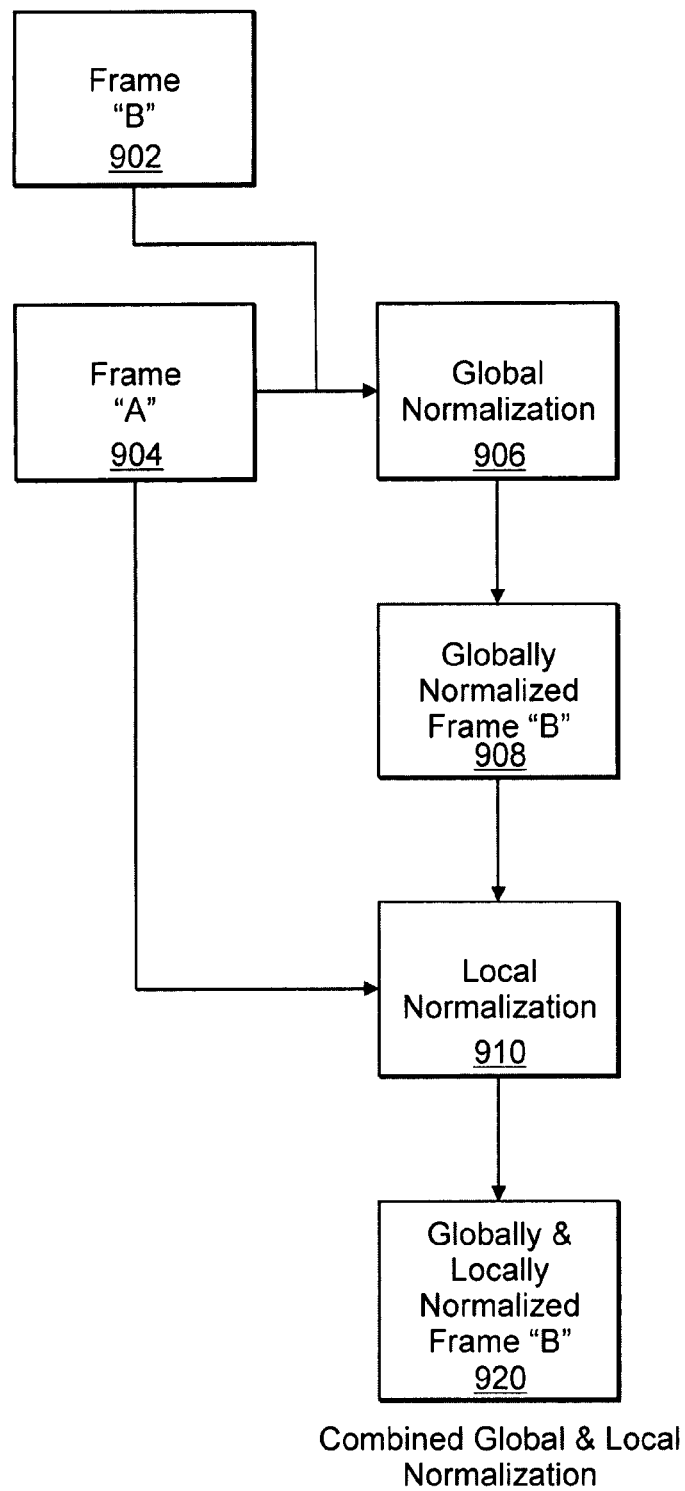
FIG. 9 is a block diagram illustrating the combined global and local normalization method of the invention.

The present inventive method utilizes one or more global motion estimation techniques including the linear solution to a set of affine projective equations. Other projective models and solution methods are described in the prior art. FIG. 9 illustrates the method of combining global and local normalization.

In FIG. 9, first and second frames 902, 904 (Frame A and Frame B) of a video sequence are input into global normalization process 906. The global normalization process 906 includes the steps of forming a global motion model (as in FIG. 4 above, for example) and tracking deformation or motion of contours and vertices of the mesh. The latter represents the global geometry of the imaged object appearing in Frames A and B (902, 904). The results of global normalization process 906 include globally normalized Frame B shown at 108 in FIG. 9. Next, Frame A 904 and globally normalized Frame B 908 are fed into a local normalization process 910. There, globally normalized Frame B is locally normalized. This results in Frame B being both globally and locally normalized 920.

Various normalization techniques for global and local normalization steps 906 and 910, respectively, are described next.

Progressive Geometric Normalization

Classification of spatial discontinuities is used to align tessellated mesh in order to model discontinuities implicitly as they are coincident with mesh edges.

Homogeneous region boundaries are approximated by a polygon contour. The contour is successively approximated at successively lower precision in order to determine the saliency priority of each polygon vertex. Vertex priority is propagated across regions in order to preserve vertex priority for shared vertices.

In one embodiment of this invention, a polygon decomposition method allows prioritization of boundaries associated with a homogeneous classification of a field. Pels are classified according to some homogeneity criteria, such as spectral similarity, and then classification labels are spatially connected into regions. In a further preferred non-limiting embodiment, 4- or 8-connectedness criteria are applied to determine spatial connectedness.

In another embodiment, the boundaries of these spatial regions are then discretized into a polygon. The spatial overlay of all the polygons for all the homogeneous regions are then tessellated and joined together into a preliminary mesh. The vertices of this mesh are decomposed using several criteria, to reveal simpler mesh representations that retain much of the perceptive saliency of the original mesh.

In a preferred image registration method, as disclosed above, is biased towards these high priority vertices with strong image gradients. Resulting deformation models tend to preserve spatial discontinuities associated with the geometry of the imaged object.

In one embodiment, active contours are used to refine region boundaries. The active contour for each polygon region is allowed to propagate one iteration. The "deformation" or motion of each active contour vertex in different regions is combined in an averaging operation to allow for a constrained propagation of the implied mesh for which they all have membership.

In another embodiment, vertices are assigned a count of the number of adjacent vertices it has in the mesh for adjacent vertices that are also part of the contour of a different region. These other vertices are defined as being in opposition. In the case of a vertex having a count of 1, then it has no opposing vertex, and thus needs to be preserved. If two adjacent opposing vertices each have a count of 1 (meaning that these two vertices are in different polygons, and are adjacent to each other), then one vertex is resolved to the other. When a vertex count of 1 opposes a neighboring polygon vertex that has a value of 2, then the vertex with a count of 1 is resolved into the vertex with a count of 2, and the resulting vertex count goes to 1. So if another neighboring opposing vertex is present, then this vertex can be resolved again. For this case, it is important to save the original vertex count, so that when a vertex is resolved, we can bias the direction of resolving based on the original vertex count. This is so that vertex a gets resolved to vertex b, then vertex b, won't get resolved to vertex c, instead vertex c should get resolved to vertex b since b has been used already in one resolution.

In another embodiment, T-junction points are processed specifically. These are points in one polygon that have no point in the adjacent polygon. In this case, each polygon vertex is first plotted on a image point map, this map identifies the spatial position of the vertex and its polygon identifier. Then each polygon perimeter is traversed, and tested to see if there are any adjacent vertices from another polygon. If there are neighboring vertices from another region, then they are each tested to see if they already have a neighboring vertex from the current polygon. If they don't then the current point is added as a vertex of the current polygon. This extra test ensures that isolated vertices in another polygon are used to generate the T-junction points. Otherwise, this would just add new vertices where this region already had a matching vertex. So an opposing vertex is added only if the neighboring vertex is not opposed by this current region. In a further embodiment, the efficiency of detecting T-junctions is increased through employing a mask image. The polygons vertices are visited sequentially, and the mask is updated such that the pels of the vertices are identified as belonging to a polygon vertex. Then the polygon perimeter pels are traversed and if they coincide with a polygon vertex, then they are recorded as a vertex within the current polygon.

In one embodiment, when a spectral region has been remapped by one or more overlapping homogenous image gradient regions, and another homogenous spectral region also overlaps, then all of the regions that were remapped previously are given the same label as those regions that are currently being remapped. So in essence, if a spectral region is overlapped by two homogenous regions, then all of the spectral regions that are overlapped by those two homogenous regions will get the same label, thus it is like that the one spectral region is really covered by one homogenous region instead of the two homogenous regions.

In one embodiment of the invention, it is advantageous to process region maps rather than region lists for the purpose of finding adjacency merge criteria. In a further embodiment, the spectral segmentation classifier can be modified to train the classifier using non-homogenous regions. This allows the processing to focus on the edges of the spectral regions. Additionally, adding different segmentation based on using edges, such as the canny edge detector, and then feeding that to active contour to identify the initial set of polygons allows for greater discrimination of homogeneous regions.

Local Normalization

The present invention provides a means by which pels in the spatiotemporal stream can be registered in a 'local' manner.

One such localized method employs the spatial application of a geometric mesh 722 (FIG. 7) to provide a means of analyzing the pels such that localized coherency in the imaged phenomena are accounted for when resolving the apparent image brightness constancy ambiguities in relation to the local deformation of the imaged phenomena, or specifically an imaged object.

Such a mesh is employed to provide a piece-wise linear model of surface deformation in the image plane as a means of local normalization. The imaged phenomena may often correspond to such a model when the temporal resolution of the video stream is high compared with the motion in the video. Exceptions to the model assumptions are handled through a variety of techniques, including: topological constraints, neighbor vertex restrictions, and analysis of homogeneity of pel and image gradient regions.

Figure 7:
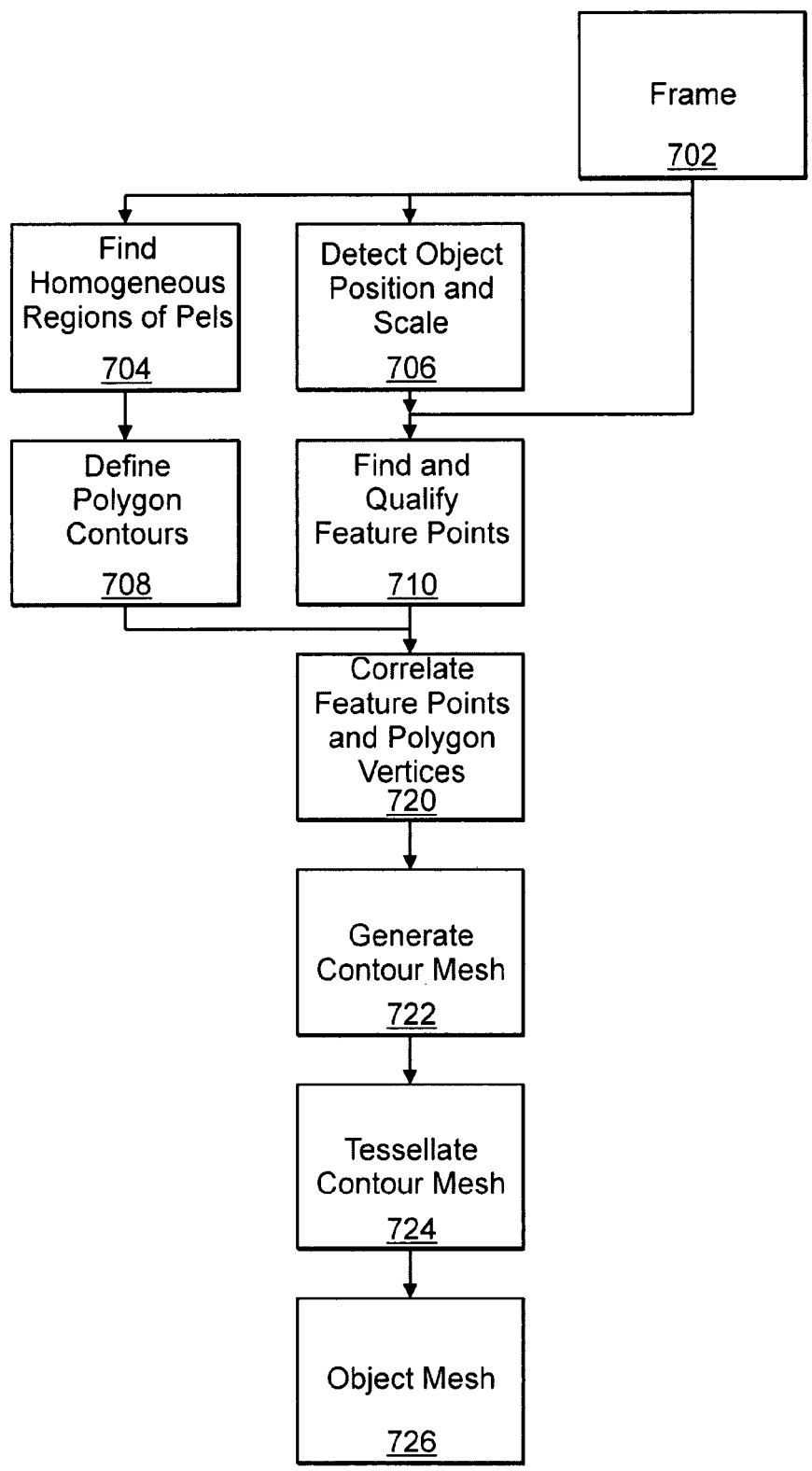
FIG. 7 is a block diagram illustrating the mesh generation method of the invention employed in local normalization.
Figure 8:
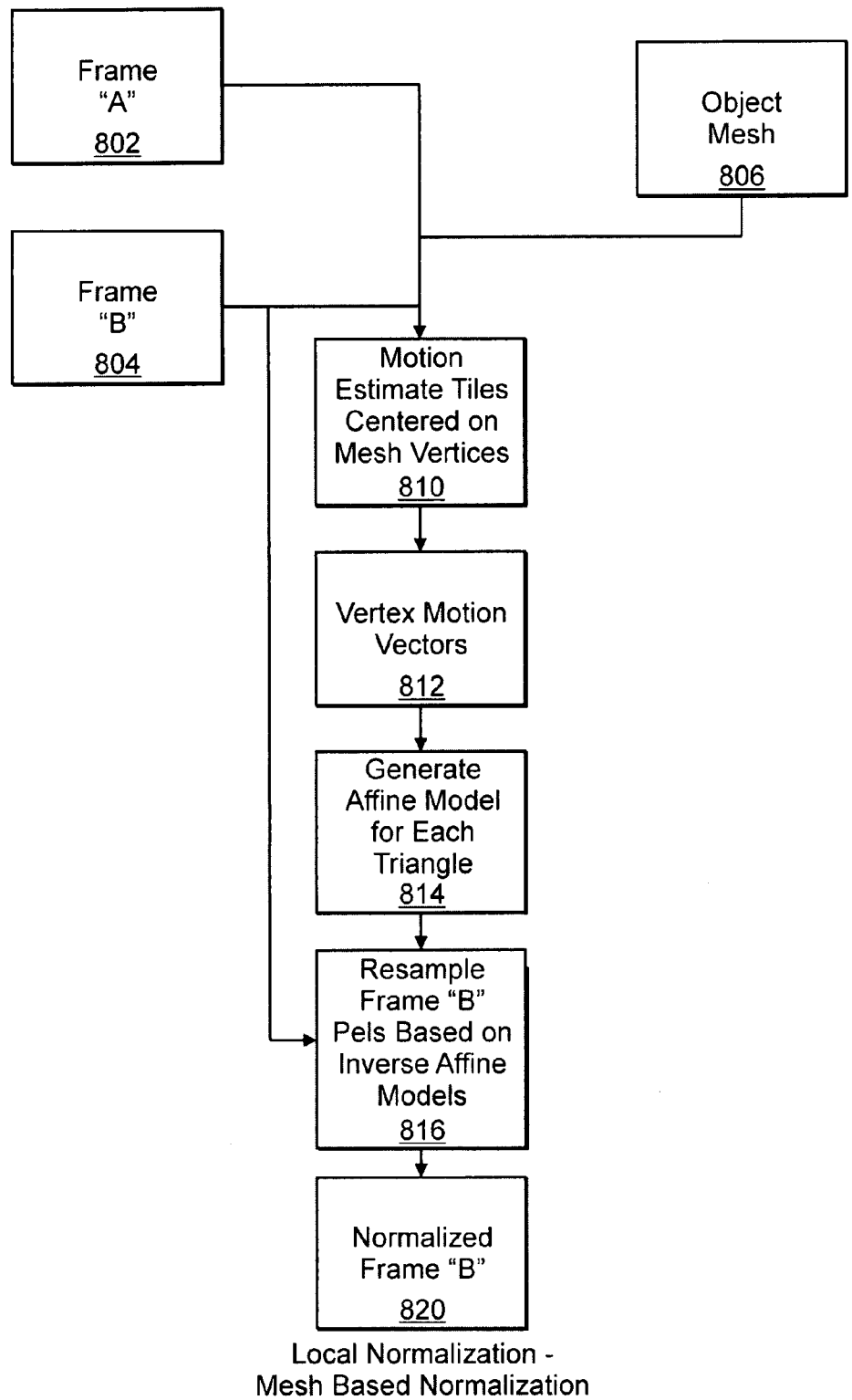
FIG. 8 is a block diagram illustrating the mesh based normalization method of the invention employed in local normalization.

In one embodiment, given a video frame 702 (FIG. 7), homogeneous regions of pels are detected 704 as are image object position and scale 706. Within the homogenous regions of pels, step 708 defines polygon contours. Step 710 detects and qualifies feature points of the image object. In particular, triangular contours are employed and feature points are used to generate a contour mesh 722 constituted of triangular elements whose vertices correspond to the feature points 720. The corresponding feature points in other frames imply an interpolated "warping" of the triangles (tessellation of contour mesh) 724, and correspondingly the pels. This results in generation of a local deformation model (object mesh) 726. FIG. 7 illustrates the generation of such an object mesh 726. FIG. 8 illustrates the use of one such object mesh 806 to locally normalize frames 802, 804.

In the local normalization process of FIG. 8, an object mesh 806 (generated by the process of FIG. 7, for example), is applied to video or image frames 802, 804 (Frame A and Frame B). For each vertex of the mesh, there is a respective tile centered thereon 810. Correspondence of vertex positions between Frames A and B 802, 804 is determined by motion estimates further discussed below and similar to those previously discussed for global motion.

The motion estimates of neighboring points are used to form vertex motion vectors 812. The motion vectors 812 are then used to generate an affine model for each tile 814. Further discussed below are triangle shaped tiles and the corresponding motion vectors and affine model for these triangles.

Continuing with FIG. 8, each tile has an affine transformation estimated for it (at 814). At step 816, Frame B 804 is resampled based on the inverse affine which results in corresponding pels stripped of local variations associated with local structure, deformation, pose and illumination across frames 802, 804. That is, normalized Frame B results at step 820.

In one preferred embodiment, a triangle map is generated which identifies the triangle that each pel of the map comes from. Further, the affine transform 814 (FIG. 8) corresponding to each triangle is pre-computed as an optimization step. And further, when creating the local deformation model, the anchor image (previous) is traversed using the spatial coordinates to determine the coordinates of the source pel to sample. This sampled pel will replace the current pel location.

In another embodiment, local deformation is preformed after global deformation. As discussed above, Global Normalization is the process by which a Global Registration method is used to spatially normalize pels in two or more frames of video data. The resulting globally normalized video frames can further be locally normalized. The combination of these two methods constrains the local normalization to a refinement of the globally arrived at solution. This can greatly reduce the ambiguity that the local method is required to resolve.

In another non-limiting embodiment, feature points, or in the case of a "regular mesh"—vertex points, are qualified through analysis of the image gradient in the neighborhood of those points. This image gradient can be calculated directly, or through some indirect calculation such as a Harris response. Additionally, these points can be filtered by a spatial constraint and motion estimation error associated with a descent of the image gradient. The qualified points can be used as the basis for a mesh by one of many tessellation techniques, resulting in a mesh whose elements are triangles. For each triangle, an affine model is generated based on the points and their residual motion vector.

The present inventive method utilizes one or more image intensity gradient analysis methods, including the Harris response. Other image intensity gradient analysis methods are described in the prior art.

In a preferred embodiment, a list of the triangles affine parameters is maintained. The list is iterated and a current/previous point list is constructed (using the vertex look up map). The current/previous point list is passed to a routine that is used to estimate the transform, which computes the affine parameters for that triangle. The affine parameters, or model 814, are then saved in the triangle affine parameter list.

In a further embodiment, the method traverses a triangle identifier image map, where each pel in the map contains the identifier for the triangle in the mesh for which the pel has membership. And for each pel that belongs to a triangle, the corresponding global deformation coordinates, and local deformation coordinates for that pel are calculated. Those coordinates, in turn, are used to sample the corresponding pel and to apply its value in the corresponding "normalize" position (e.g. at 816 in FIG. 8).

In a further embodiment, spatial constraints are applied to the points based on density and the image intensity correspondence strength resulting from the search of the image gradient. The points are sorted after motion estimation is done based on some norm of the image intensity residual. Then the points are filtered based on a spatial density constraint.

In a further embodiment, spectral spatial segmentation is employed, and small homogeneous spectral regions are merged based on spatial affinity, similarity of their intensity and/or color, with neighboring regions. Then homogenous merging is used to combine spectral regions together based on their overlap with a region of homogenous texture (image gradient). A further embodiment then uses center-surround points, those were a small region is surrounded by a larger region, as qualified interest points for the purpose of supporting a vertex point of the mesh. In a further non-limiting embodiment, a center surround point is defined as a region whose bounding box is within one pel of being 3×3 or 5×5 or 7×7 pels in dimension, and the spatial image gradient for that bounding box is a corner shape. The center of the region can be classified as a corner, further qualifying that position as an advantageous vertex position.

In a further embodiment, the horizontal and vertical pel finite difference images are used to classify the strength of each mesh edge. If an edge has many finite differences coincident with its spatial position, then the edge, and hence the vertices of that edge are considered to be highly critical to the local deformation of the imaged phenomena. If there is a large derivative difference between the averages of the sums of the finite differences of the edge, then mostly likely the region edge corresponds to a texture change edge, and not a quantization step.

In a further embodiment, a spatial density model termination condition is employed to optimize the processing of the mesh vertices 810. When a sufficient number of points have been examined that covers most of the spatial area of an outset of the detection rectangle, then the processing can be terminated. The termination generates a score. Vertex and feature points entering the processing are sorted by this score. If the point is too spatially close to an existing point, or if the point does not correspond to an edge in the image gradient, then it is discarded. Otherwise, the image gradient in the neighborhood of the point is descended, and if the residual of the gradient exceeds a limit, then that point is also discarded.

In a preferred embodiment, the local deformation modeling is performed iteratively, converging on a solution as the vertex displacements per iteration diminish. In another embodiment, local deformation modeling is performed, and the model parameters are discarded if the global deformation has already provided the same normalization benefit.

Regular Mesh Normalization

The present invention extends the aforementioned Local Normalization method utilizing a regular mesh. This mesh is constructed without regard to the underlying pels, yet it is positioned and sized corresponding to a detected object.

Given a detected object (e.g., face) region, a spatial frame position and a scale indicating the size of the object face, generate a regular mesh over an outset of the face region. In a preferred embodiment, a non-overlapping set of tiles is used to delineate a rectangular mesh and then a diagonal partitioning of the tiles is performed to yield a regular mesh having triangular mesh elements at 810. In a further preferred embodiment, tiles are proportional to those used in conventional video compression algorithms (e.g. MPEG-4 AVC).

In a preferred embodiment, vertices associated 810 with the aforementioned mesh are prioritized through analysis of the pel regions surrounding these vertices in specific frames of the video used for training. Analysis of the gradient of such regions provides a confidence regarding processing associated with each vertex that would rely on the local image gradient (such as block-based motion estimation).

Correspondences of vertex positions in multiple frames are found through a simple descent of the image gradient. In a preferred embodiment this is achieved through block-based motion estimates at 810. In the present embodiment high confidence vertices allow for high confidence correspondences. Lower confidence vertex correspondences are arrived at implicitly through resolving ambiguous image gradients through inference from higher confidence vertex correspondences.

In one preferred embodiment, a regular mesh is made over the outset tracking rectangle. Tiles are created 16×16, and are cut diagonally, to form a triangular mesh. The vertices of these triangles are motion estimated 810. The motion estimation depends on the type of texture that each point has. The texture is divided into three classes, corner, edge, and homogenous, which also defines the order of processing of the vertices. A corner vertex uses neighboring vertex estimation, i.e. the motion estimates of the neighboring points (if available) are used for predictive motion vectors 812, and motion estimation is applied to each one. The motion vector that provides the lowest error is used as this vertex motion vector 812. The search strategy used for the corner is all (wide, small, and origin). For edges, again the nearest neighbor motion vectors 812 are used as predictive motion vectors, and the one with the least amount of error is used. The search strategy for edges is small and origin. For homogenous the neighboring vertices are searched and the motion estimate with the lowest error is used.

In one preferred embodiment, the image gradient for each triangle vertex is calculated, and sorted based on the class and magnitude. So corners are before edges, which are before homogenous. For corners, strong corners are before weak corners, and for edges, strong edges are before weak edges.

In one preferred embodiment, the local deformation for each triangle is based on a motion estimate associated with that triangle. Each triangle has an affine estimated for it 814. If the triangle doesn't topologically invert, or become degenerate, then the pels that are part of the triangle are used to sample the current image, based on the estimate affine obtained 814.

Segmentation

The spatial discontinuities identified through the further described segmentation processes are encoded efficiently through geometric parameterization of their respective boundaries, referred to as spatial discontinuity models. These spatial discontinuity models may be encoded in a progressive manner allowing for ever more concise boundary descriptions corresponding to subsets of the encoding. Progressive encoding provides a robust means of prioritizing the spatial geometry while retaining much of the salient aspects of the spatial discontinuities.

A preferred embodiment of the present invention combines a multi-resolution segmentation analysis with the gradient analysis of the spatial intensity field and further employs a temporal stability constraint in order to achieve a robust segmentation. As shown in FIG. 2, once the correspondences of features of an object have been tracked over time (220) and modeled (224), adherence to this motion/deformation model can be used to segment the pels corresponding to the object (230). This process is repeated for a multitude of detected objects (206, 208) in the video data/frames (202, 204). The results of this processing are the segmented object pels (232).

One form of invariant feature analysis employed by the present invention is focused on the identification of spatial discontinuities. These discontinuities manifest as edges, shadows, occlusions, lines, corners, or any other visible characteristic that causes an abrupt and identifiable separation between pels in one or more imaged frames of video. Additionally, subtle spatial discontinuities between similarly colored and/or textured objects may only manifest when the pels of the objects in the video frame are undergoing coherent motion relative to the objects themselves, but different motion relative to each other. The present invention utilizes a combination of spectral, texture, and motion segmentation to robustly identify the spatial discontinuities associated with a salient signal mode.

Temporal Segmentation

The temporal integration of translational motion vectors, or equivalently finite difference measurements in the spatial intensity field, into a higher-order motion model is a form of motion segmentation that is described in the prior art.

In one embodiment of the invention, a dense field of motion vectors is produced representing the finite differences of object motion in the video. These derivatives are grouped together spatially through a regular partitioning of tiles or by some initialization procedure such as spatial segmentation. The "derivatives" of each group are integrated into a higher order motion model using a linear least squares estimator. The resulting motion models are then clustered as vectors in the motion model space using the k-means clustering technique. The derivatives are classified based on which cluster best fits them. The cluster labels are then spatially clustered as an evolution of the spatial partitioning. The process is continued until the spatial partitioning is stable.

In a further embodiment of the invention, motion vectors for a given aperture are interpolated to a set of pel positions corresponding to the aperture. When the block defined by this interpolation spans pels corresponding to an object boundary, the resulting classification is some anomalous diagonal partitioning of the block.

In the prior art, the least squares estimator used to integrate the derivatives is highly sensitive to outliers. The sensitivity can generate motion models that heavily bias the motion model clustering method to the point that the iterations diverge widely.

In the present invention the motion segmentation methods identify spatial discontinuities through analysis of apparent pel motion over two or more frames of video. The apparent motion is analyzed for consistency over the frames of video and integrated into parametric motion models. Spatial discontinuities associated with such consistent motion are identified. Motion segmentation can also be referred to as temporal segmentation, because temporal changes may be caused by motion. However, temporal changes may also be caused by some other phenomena such as local deformation, illumination changes, etc.

Through the described method, the salient signal mode that corresponds to the normalization method can be identified and separated from the ambient signal mode (background or non-object) through one of several background subtraction methods. Often, these methods statistically model the background as the pels that exhibit the least amount of change at each time instance. Change can be characterized as a pel value difference.

Segmentation perimeter-based global deformation modeling is achieved by creating a perimeter around the object, then collapsing the perimeter toward the detected center of the object until perimeter vertices have achieved a position coincident with a heterogeneous image gradient. Motion estimates are gathered for these new vertex positions, and robust affine estimation is used to find the global deformation model.

Integration of segmented mesh vertex image gradient descent-based finite differences into global deformation model.

Object Segmentation

Figure 13:
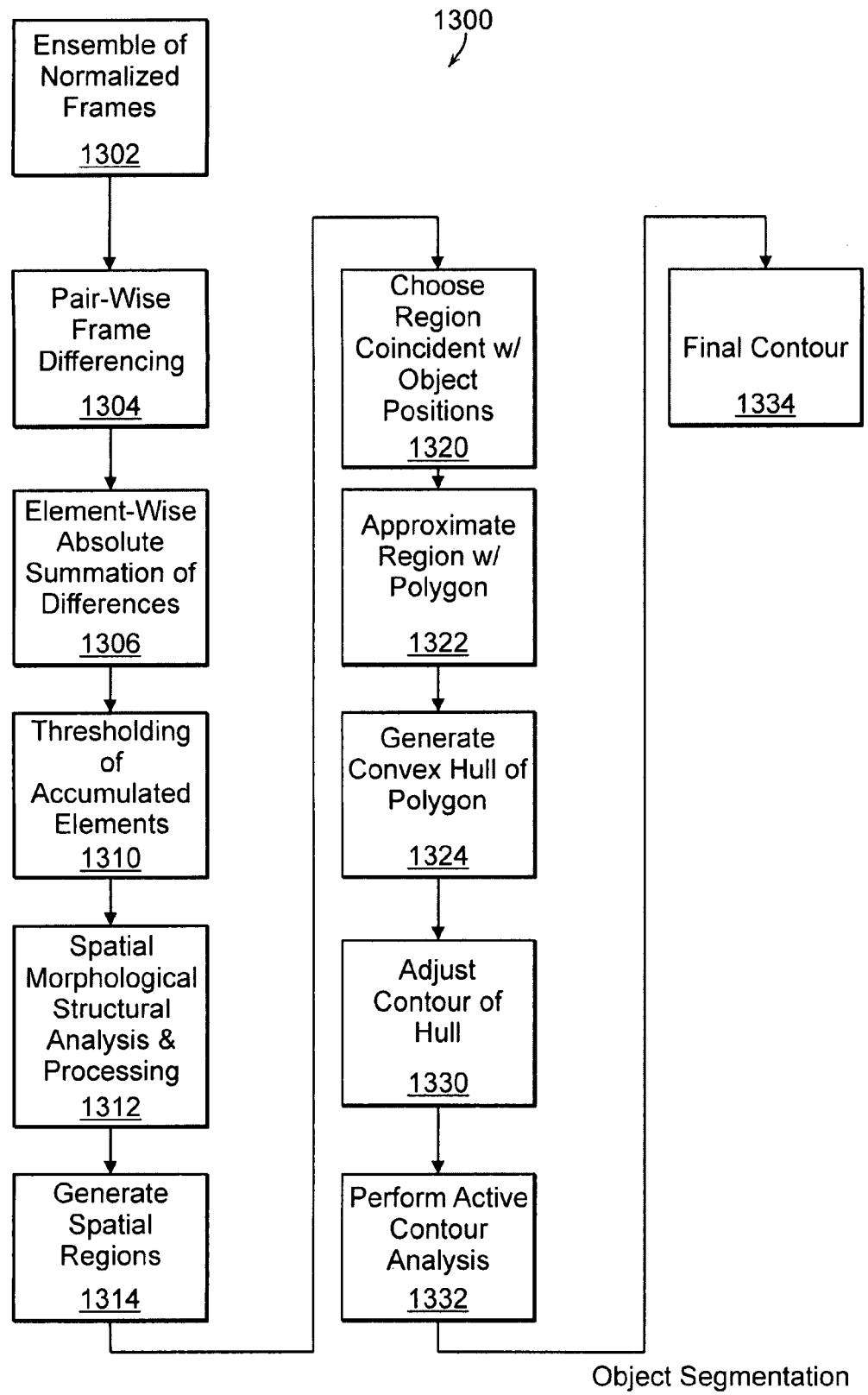
FIG. 13 is a block diagram illustrating the object segmentation method of the invention.

The block diagram shown in FIG. 13 shows one preferred embodiment of object segmentation. The process 1300 shown begins with an ensemble of normalized video frames/images (1302) that are then pair-wise differenced (1304) among the ensemble. These differences are then element-wise accumulated (1306) into an accumulation buffer. The accumulation buffer is thresholded (1310) in order to identify the more significant error regions. The thresholded element mask is then morphologically analyzed (1312) in order to determine the spatial support of the accumulated error regions (1310). The resulting extraction (1314) of the morphological analysis (1312) is then compared with the detected object position (1320) in order to focus subsequent processing on accumulated error regions that are coincident with the object. The isolated spatial region's (1320) boundary is then approximated with a polygon (1322) of which a convex hull is generated (1324). The contour of the hull is then adjusted (1330) in order to better initialize the vertices' positions for active contour analysis (1332). Once the active contour analysis (1332) has converged on a low energy solution in the accumulated error space, the contour is used as the final contour (1334) and the pels contained in the contour are considered those that are most likely object pels. Those pels outside of the final contour (1334) are considered to be non-object pels.

In one embodiment, motion segmentation can be achieved given the detected position and scale of the salient image model. A distance transform can be used to determine the distance of every pel from the detected position. If the pel values associated with the maximum distance are retained, a reasonable model of the background can be resolved. In other words, the ambient signal is re-sampled temporally using a signal difference metric.

A further embodiment includes employing a distance transform relative to the current detection position to assign a distance to each pel. If the distance to a pel is greater than the distance in some maximum pel distance table, then the pel value is recorded. After a suitable training period, the pel is assumed to have the highest probability of being a background pel if the maximum distance for that pel is large.

Given a model of the ambient signal, the complete salient signal mode at each time instance can be differenced. Each of these differences can be re-sampled into spatially normalized signal differences (absolute differences). These differences are then aligned relative to each other and accumulated. Since these differences have been spatially normalized relative to the salient signal mode, peaks of difference will mostly correspond to pel positions that are associated with the salient signal mode.

In one embodiment of the invention, a training period is defined where object detection positions are determined and a centroid of those positions is used to determine optimal frame numbers with detection positions far from this position that would allow for frame differencing to yield background pels that would have the highest probability of being non-object pels.

In one embodiment of the present invention, active contour modeling used to segment the foreground object from the non-object background by determining contour vertex positions in accumulated error "image". In a preferred embodiment the active contour edges are subdivided commensurate with the scale of the detected object to yield a greater degree of freedom. In a preferred embodiment, the final contour positions can be snapped to a nearest regular mesh vertex in order to yield a regularly spaced contour.

In one non-limiting embodiment of object segmentation, an oriented kernel is employed for generating error image filter responses for temporally pair-wise images. Response to the filter that is oriented orthogonal to the gross motion direction tends to enhance the error surface when motion relative to the background occurs from occlusion and revealing of the background.

The normalized image frame intensity vectors of an ensemble of normalized images are differenced from one or more reference frame creating residual vectors. These residual vectors are accumulated element-wise to form an accumulated residual vector. This accumulated residual vector is then probed spatially in order to define a spatial object boundary for spatial segmentation of the object and non-object pels.

In one preferred embodiment, an initial statistical analysis of the accumulated residual vector is performed to arrive at a statistical threshold value that can be used to threshold the accumulated residual vector. Through an erosion and subsequent dilation morphological operation, a preliminary object region mask is created. The contour polygon points of the region are then analyzed to reveal the convex hull of those points. The convex hull is then used as an initial contour for an active contour analysis method. The active contour is the propagated until it converges on the spatial boundaries of the object's accumulated residual. In a further preferred embodiment, the preliminary contour's edges are further subdivided by adding midpoint vertices until a minimal edge length is achieved for all the edge lengths. This further embodiment is meant to increase the degrees of freedom of the active contour model to more accurately fit the outline of the object.

In one embodiment, the refined contour is used to generate a pel mask indicating the pels of the object by overlaying the polygon implied by the contour and overlaying the polygon in the normalized images.

Resolution of Non-Object

Figure 12:
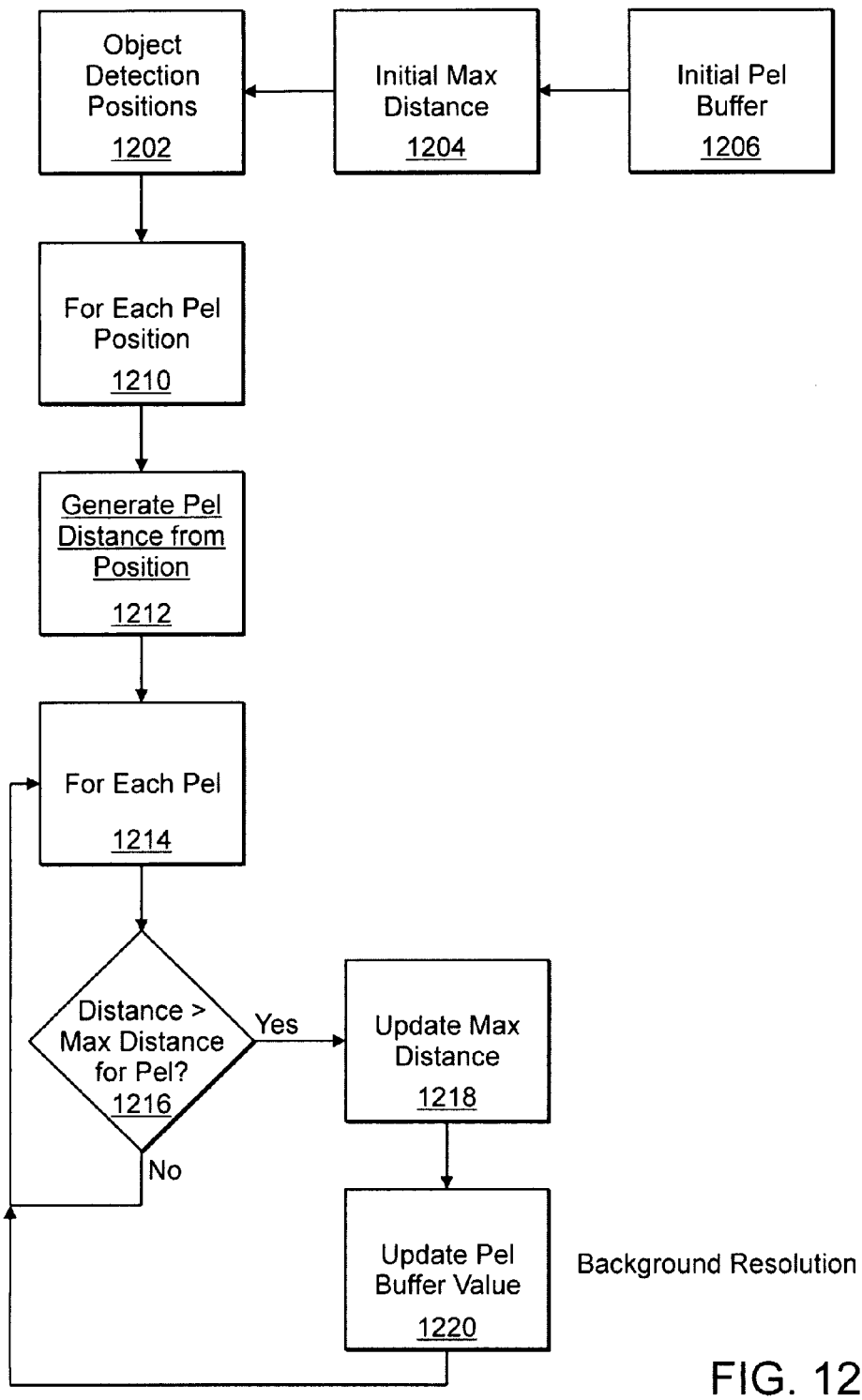
FIG. 12 is a block diagram illustrating the background resolution method.

The block diagram shown in FIG. 12 discloses one preferred embodiment of non-object segmentation, or equivalently background resolution. With the initialization of a background buffer (1206) and an initial maximum distance value (1204) buffer, the process works to determine the most stable non-object pels by associating "stability" with the greatest distance from the detected object position (1202). Given a new detected object position (1202), the process checks each pel position (1210). For each pel position (1210), the distance 1212 from the detected object position is calculated using a distance transform. If the distance for that pel is greater (1216) than the previously stored position in the maximum distance buffer (1204) then the previous value is replace with the current value (1218) and the pel value is recorded (1220) in the pel buffer. The comparison (1216) of pel distance to maximum stored distance is repeated for each pel (1214).

Given a resolved background image, the error between this image and the current frame can be normalized spatially and accumulated temporally. Such a resolved background image is described in the "background resolution" section. The resolution of the background through this method is considered a time-based occlusion filter process.

The resulting accumulated error is then thresholded to provide an initial contour. The contour is then propagated spatially to balance error residual against contour deformation.

In an alternative embodiment, absolute differences between the current frame and the resolved background frames is computed. The element-wise absolute difference is then segmented into distinct spatial regions. These regions bounding boxes average pel value is computed, so that when the resolved background is updated, the difference between the current and resolved background average pel value can be used to perform a contrast shift, so that the current region can blend in more effectively with the resolved background. In another embodiment, the vertices within the normalized frame mask are motion estimated and saved for each frame. These are then processed using SVD to generate a local deformation prediction for each of the frames.

Gradient Segmentation

The texture segmentation methods, or equivalently, intensity gradient segmentation, analyze the local gradient of the pels in one or more frames of video. The gradient response is a statistical measure which characterizes the spatial discontinuities local to a pel position in the video frame. One of several spatial clustering techniques is then used to combine the gradient responses into spatial regions. The boundaries of these regions are useful in identifying spatial discontinuities in one or more of the video frames.

In one embodiment of the invention, the summed area table concept from computer graphics texture generation is employed for the purpose of expediting the calculation of the gradient of the intensity field. A field of progressively summed values is generated facilitating the summation of any rectangle of the original field through four lookups combined with four addition operations.

A further embodiment employs the Harris response which is generated for an image and the neighborhood of each pel is classified as being either homogeneous, an edge, or a corner. A response value is generated from this information and indicates the degree of edge-ness or cornered-ness for each element in the frame.

Multi-Scale Gradient Analysis

An embodiment of the present invention further constrains the image gradient support by generating the image gradient values through several spatial scales. This method can help qualify the image gradient such that spatial discontinuities at different scales are used to support each other—as long as an "edge" is discriminated at several different spatial scales, the edge should be "salient". A more qualified image gradient will tend to correspond to a more salient feature.

In one embodiment, the texture response field is first generated, the values of this field are then quantized into several bins based on a k-means binning/partitioning. The original image gradient values are then progressively processed using each bin as an interval of values to which a single iteration can apply watershed segmentation. The benefit of such an approach is that homogeneity is defined in a relative sense with a strong spatial bias.

Spectral Segmentation

The spectral segmentation methods analyze the statistical probability distribution of the black and white, grayscale, or color pels in the video signal. A spectral classifier is constructed by performing clustering operations on the probability distribution of those pels. The classifier is then used to classify one or more pels as belonging to a probability class. The resulting probability class and its pels are then given a class label. These class labels are then spatially associated into regions of pels with distinct boundaries. These boundaries identify spatial discontinuities in one or more of the video frames.

The present invention may utilize spatial segmentation based on spectral classification to segment pels in frames of the video. Further, correspondence between regions may be determined based on overlap of spectral regions with regions in previous segmentations.

It is observed that when video frames are roughly made up of continuous color regions that are spatially connected into larger regions that correspond to objects in the video frame, identification and tracking of the colored (or spectral) regions can facilitate the subsequent segmentation of objects in a video sequence.

Background Segmentation

The described invention includes a method for video frame background modeling that is based on the temporal maximum of spatial distance measurements between a detected object and each individual pel in each frame of video. See above description of FIG. 12. Given the detected position of the object, the distance transformation is applied, creating a scalar distance value for each pel in the frame. A map of the maximum distance over all of the video frames for each pel is retained. When the maximum value is initially assigned, or subsequently updated with a new and different value, the corresponding pel for that video frame is retained in a "resolved background" frame.

Appearance Modeling

A common goal of video processing is often to model and preserve the appearance of a sequence of video frames. The present invention is aimed at allowing constrained appearance modeling techniques to be applied in robust and widely applicable ways through the use of preprocessing. The registration, segmentation, and normalization described previously are expressly for this purpose.

The present invention discloses a means of appearance variance modeling. The primary basis of the appearance variance modeling is, in the case of a linear model, the analysis of feature vectors to reveal compact basis exploiting linear correlations. Feature vectors representing spatial intensity field pels can be assembled into an appearance variance model.

In an alternative embodiment, the appearance variance model is calculated from a segmented subset of the pels. Further, the feature vector can be separated into spatially non-overlapping feature vectors. Such spatial decomposition may be achieved with a spatial tiling. Computational efficiency may be achieved through processing these temporal ensembles without sacrificing the dimensionality reduction of the more global PCA method.

When generating an appearance variance model, spatial intensity field normalization can be employed to decrease PCA modeling of spatial transformations.

Deformation Modeling

Local deformation can be modeled as vertex displacements and an interpolation function can be used to determine the resampling of pels according to vertices that are associated with those pels. These vertex displacements may provide a large amount of variation in motion when looked at as a single parameter set across many vertices. Correlations in these parameters can greatly reduce the dimensionality of this parameter space.

PCA

The preferred means of generating an appearance variance model is through the assembly of frames of video as pattern vectors into a training matrix, or ensemble, and application of Principal Component Analysis (PCA) on the training matrix. When such an expansion is truncated, the resulting PCA transformation matrix is employed to analyze and synthesize subsequent frames of video. Based on the level of truncation, varying levels of quality of the original appearance of the pels can be achieved. The specific means of construction and decomposition of the pattern vectors is well known to one skilled in the art.

Given the spatial segmentation of the salient signal mode from the ambient signal and the spatial normalization of this mode, the pels themselves, or equivalently, the appearance of the resulting normalized signal, can be factored into linearly correlated components with a low rank parameterization allowing for a direct trade-off between approximation error and bit-rate for the representation of the pel appearance. One method for achieving a low rank approximation is through the truncation of bytes and/or bits of encoded data. A low rank approximation is considered a compression of the original data as determined by the specific application of this technique. For example, in video compression, if the truncation of data does not unduly degrade the perceptual quality then the application specific goal is achieved along with compression.

As shown in FIG. 2, the normalized object pels (242 & 244) can be projected into a vector space and the linear correspondences can be modeled using a decomposition process (250) such as PCA in order to yield a dimensionally concise version of the data (252 & 254).

Sequential PCA

PCA encodes patterns into PCA coefficients using a PCA transform. The better the patterns are represented by the PCA transform, the fewer coefficients are needed to encode the pattern. Recognizing that pattern vectors may degrade as time passes between acquisition of the training patterns and the patterns to be encoded, updating the transform can help to counter act the degradation. As an alternative to generating a new transform, sequential updating of existing patterns is more computationally efficient in certain cases.

Many state-of-the-art video compression algorithms predict a frame of video from one or more other frames. The prediction model is commonly based on a partitioning of each predicted frame into non-overlapping tiles which are matched to a corresponding patch in another frame and an associated translational displacement parameterized by an offset motion vector. This spatial displacement, optionally coupled with a frame index, provides the "motion predicted" version of the tile. If the error of the prediction is below a certain threshold, the tile's pels are suitable for residual encoding; and there is a corresponding gain in compression efficiency. Otherwise, the tile's pels are encoded directly. This type of tile-based, alternatively termed block-based, motion prediction method models the video by translating tiles containing pels. When the imaged phenomena in the video adheres to this type of modeling, the corresponding encoding efficiency increases.

This modeling constraint assumes a certain level of temporal resolution, or number of frames per second, is present for imaged objects undergoing motion in order to conform to the translational assumption inherent in block-based prediction. Another requirement for this translational model is that the spatial displacement for a certain temporal resolution must be limited; that is, the time difference between the frames from which the prediction is derived and the frame being predicted must be a relatively short amount of absolute time. These temporal resolution and motion limitations facilitate the identification and modeling of certain redundant video signal components that are present in the video stream. In the present inventive method, sequential PCA is combined with embedded zero-tree wavelet to further enhance the utility of the hybrid compression method. The Sequential PCA technique provides a means by which conventional PCA can be enhanced for signals that have a temporal coherency or temporally local smoothness. The embedded zero-tree wavelet provides a means by which a locally smooth spatial signal can be decomposed into a space-scale representation in order to increase the robustness of certain processing and also the computational efficiency of the algorithm. For the present invention, these two techniques are combined to increase the representation power of the variance models and also provide a representation of those models that is compact and ordered such that much of the representational power of the basis is provided by a truncation of the basis.

In another embodiment, sequential PCA is applied with a fixed input block size and fixed tolerance to increase the weighted bias to the first and most energetic PCA components. For longer data sequences this first PCA component is often the only PCA component. This affects the visual quality of the reconstruction and can limit the utility of the described approach in some ways. The present invention employs a different norm for the selection of PCA components that is preferable to the use of the conventionally used least-square norm. This form of model selection avoids the over-approximation by the first PCA component.

In another embodiment, a block PCA process with a fixed input block size and prescribed number of PCA components per data block is employed to provide beneficial uniform reconstruction traded against using relatively more components. In a further embodiment, the block PCA is used in combination with sequential PCA, where block PCA reinitializes the sequential PCA after a set number of steps with a block PCA step. This provides a beneficial uniform approximation with a reduction in the number of PCA components.

In another embodiment, the invention capitalizes on the situation where the PCA components before and after encoding-decoding are visually similar. The quality of the image sequence reconstructions before and after encoding-decoding may also be visually similar and this often depends on the degree of quantization employed. The present inventive method decodes the PCA components and then renormalizes them to have a unit norm. For moderate quantization the decoded PCA components are approximately orthogonal. At a higher level of quantization the decoded PCA components are partially restored by application of SVD to obtain an orthogonal basis and modified set of reconstruction coefficients.

In another embodiment, a variable and adaptable block size is applied with a hybrid sequential PCA method in order to produce improved results with regard to synthesis quality. The present invention bases the block size on a maximum number of PCA components and a given error tolerance for those blocks. Then, the method expands the current block size until the maximum number of PCA components is reached. In a further embodiment, the sequence of PCA components is considered as a data stream, which leads to a further reduction in the dimensionality. The method performs a post-processing step where the variable data blocks are collected for the first PCA component from each block and SVD is applied to further reduce the dimensionality. The same process is then applied to the collection of second, third, etc components.

Symmetric Decomposition

In one embodiment of the invention, a decomposition is performed based on a symmetric ensemble. This ensemble represents a square image as the sum of six orthogonal components. Each component corresponds to a different symmetry of the square. By symmetry, each orthogonal component is determined by a "fundamental region" that is mapped by the action of symmetry into the complete component. The sum of the fundamental regions has the same cardinality as the input image, assuming the input image itself has no particular symmetry.

Residual-Based Decomposition

In MPEG video compression, the current frame is constructed by motion compensating the previous frame using motion vectors, followed by application of a residual update for the compensation blocks, and finally, any blocks that do not have a sufficient match are encoded as new blocks.

The pels corresponding to residual blocks are mapped to pels in the previous frame through the motion vector. The result is a temporal path of pels through the video that can be synthesized through the successive application of residual values. These pels are identified as ones that can be best represented using PCA.

Occlusion-Based Decomposition

A further enhancement of the invention determines if motion vectors applied to blocks will cause any pels from the previous frame to be occluded (covered) by moving pels. For each occlusion event, split the occluding pels into a new layer. There will also be revealed pels without a history. The revealed pels are placed onto any layer that will fit them in the current frame and for which a historical fit can be made for that layer.

The temporal continuity of pels is supported through the splicing and grafting of pels to different layers. Once a stable layer model is arrived at, the pels in each layer can be grouped based on membership to coherent motion models.

Sub-Band Temporal Quantization

An alternative embodiment of the present invention uses discrete cosine transform (DCT) or discrete wavelet transform (DWT) to decompose each frame into sub-band images. Principal component analysis (PCA) is then applied to each of these "sub-band" videos. The concept is that sub-band decomposition of a frame of video decreases the spatial variance in any one of the sub-bands as compared with the original video frame.

For video of a moving object (person), the spatial variance tends to dominate the variance modeled by PCA. Sub-band decomposition reduces the spatial variance in any one decomposition video.

For DCT, the decomposition coefficients for any one sub-band are arranged spatially into a sub-band video. For instance, the DC coefficients are taken from each block and arranged into a sub-band video that looks like a postage stamp version of the original video. This is repeated for all the other sub-bands, and the resulting sub-band videos are each processed using PCA.

For DWT, the sub-bands are already arranged in the manner described for DCT. In a non-limiting embodiment, the truncation of the PCA coefficients is varied.

Wavelet

When a data is decomposed using the discrete Wavelet transform (DWT), multiple band-pass data sets result at lower spatial resolutions. The transformation process can be recursively applied to the derived data until only single scalar values results. The scalar elements in the decomposed structure are typically related in a hierarchical parent/child fashion. The resulting data contains a multi resolution hierarchical structure and also finite differences as well.

When DWT is applied to spatial intensity fields, many of the naturally occurring images' phenomena are represented with little perceptual loss by the first or second low band pass derived data structures due to the low spatial frequency. Truncating the hierarchical structure provides a compact representation when high frequency spatial data is either not present or considered noise.

While PCA may be used to achieve accurate reconstruction with a small number of coefficients, the transform itself can be quite large. To reduce the size of this "initial" transform, an embedded zero tree (EZT) construction of a wavelet decomposition can be used to build a progressively more accurate version of the transformation matrix.

Subspace Classification

As is well understood by those practiced in the art, discretely sampled phenomena data and derivative data can be represented as a set of data vectors corresponding to an algebraic vector space. These data vectors include, in a non-limiting way, the pels in the normalized appearance of the segmented object, the motion parameters, and any structural positions of features or vertices in two or three dimensions. Each of these vectors exists in a vector space, and the analysis of the geometry of the space can be used to yield concise representations of the sampled, or parameter, vectors. Beneficial geometric conditions are typified by parameter vectors that form compact subspaces. When one or more subspaces are mixed, creating a seemingly more complex single subspace, the constituent subspaces can be difficult to discern. There are several methods of segmentation that allow for the separation of such subspaces through examining the data in a higher dimensional vector space that is created through some interaction of the original vectors (such as inner product).

Feature Subspace Classification

A feature subspace is constructed using a DCT decomposition of the region associated with an object. Each resulting coefficient matrix is converted into a feature vector. These feature vectors are then clustered spatially in the resulting vector space.

The clustering provides groups of image object instances that can be normalized globally and locally toward some reference object instance. These normalized object instances can then be used as an ensemble for PCA.

In one preferred embodiment, the DCT matrix coefficients are summed as the upper and lower triangles of a matrix. These sums are considered as elements of a two dimensional vector.

In one preferred embodiment, the most dense cluster is identified and the vectors most closely associated with the cluster are selected. The pels associated with the object instances corresponding to these pels are considered most similar to each other. The selected vectors can then be removed from the subspace and a re-clustering can yield another set of related vectors corresponding to related object instances.

In a further embodiment, the image object instances associated with the identified cluster's vectors are globally normalized toward the cluster centroid. Should the resulting normalization meet the distortion requirements, then the object instance is considered to be similar to the centroid. A further embodiment allows for failing object instances to be returned to the vector space to be candidates for further clustering.

In another embodiment, clusters are refined by testing their membership against the centroids of other clustered object instances. The result is that cluster membership may change and therefore yield a refinement that allows for the clusters to yield object instance images that are most similar.

Ensemble Processing

The present inventive method may utilize an ensemble selection and processing. The method selects a small subset of images from the candidate training pool based on the deformation distance of the images from the key image in the pool. In a preferred embodiment, the DCT intra cluster distance is used as the means of determining which of the candidate images will be used to represent the variance in the cluster.

A further embodiment projects images from different clusters into different PCA spaces in order to determine ensemble membership of the remaining images. The projection is preceded by a global and local normalization of the image relative to the key ensemble image or the ensemble average.

Object Encoding

One embodiment of the invention performs a Fourier subspace classification on an instance of a detected object to identify one or more candidate ensembles for encoding the object instance. The closest matching ensembles are then further qualified through global and local normalization of the image relative to the key ensemble image or the ensemble average. Upon identification of the ensemble for an image, the normalized image is then segmented and decomposed using the ensemble basis vectors. The resulting coefficients are the decomposed coefficients corresponding to the original object at the instance of time corresponding to the frame containing the object. These coefficients are also referred to as the appearance coefficients.

Sequence Reduction

The present inventive method has a means for further reducing the coding of images utilizing an interpolation of the decomposed coefficients. The temporal stream is analyzed to determine if sequences of the appearance and/or deformation parameters have differentials that are linear. If such is the case, then only the first and last parameters are sent with an indication that the intermediate parameters are to be linearly interpolated.

Tree Ensemble

The present invention has a preferred embodiment in which the ensemble is organized into a dependency tree that is branched based on similarity of pattern vectors. The "root" of the tree is established as the key pattern of the ensemble. Additional ensemble patterns are added to the tree and become "leaves" of the tree. The additional patterns are placed as dependents to whichever tree node is most similar to the pattern. In this way the ensemble patterns are organized such that a dependency structure is created based on similarity. This structure is utilized as an alternative to "Sequence Reduction", providing the same method with the difference that in stead of interpolating a sequence of pattern vectors, a traversal of the tree is used as an alternative to the temporal ordering.

Hybrid Spatial Normalization Compression

The present invention extends the efficiency of block-based motion predicted coding schemes through the addition of segmenting the video stream into two or more "normalized" streams. These streams are then encoded separately to allow the conventional codec's translational motion assumptions to be valid. Upon decoding the normalized streams, the streams are de-normalized into their proper position and composited together to yield the original video sequence.

In one embodiment, one or more objects are detected in the video stream and the pels associated with each individual object are subsequently segmented leaving non-object pels. Next, a global spatial motion model is generated for the object and non-object pels. The global model is used to spatially normalize object and non-object pels. Such a normalization has effectively removed the non-translational motion from the video stream and has provided a set of videos whose occlusion interaction has been minimized. These are both beneficial features of the present inventive method.

The new videos of object and the non-object, having their pels spatially normalized, are provided as input to a conventional block-based compression algorithm. Upon decoding of the videos, the global motion model parameters are used to de-normalize those decoded frames, and the object pels are composited together and onto the non-object pels to yield an approximation of the original video stream.

Figure 6:
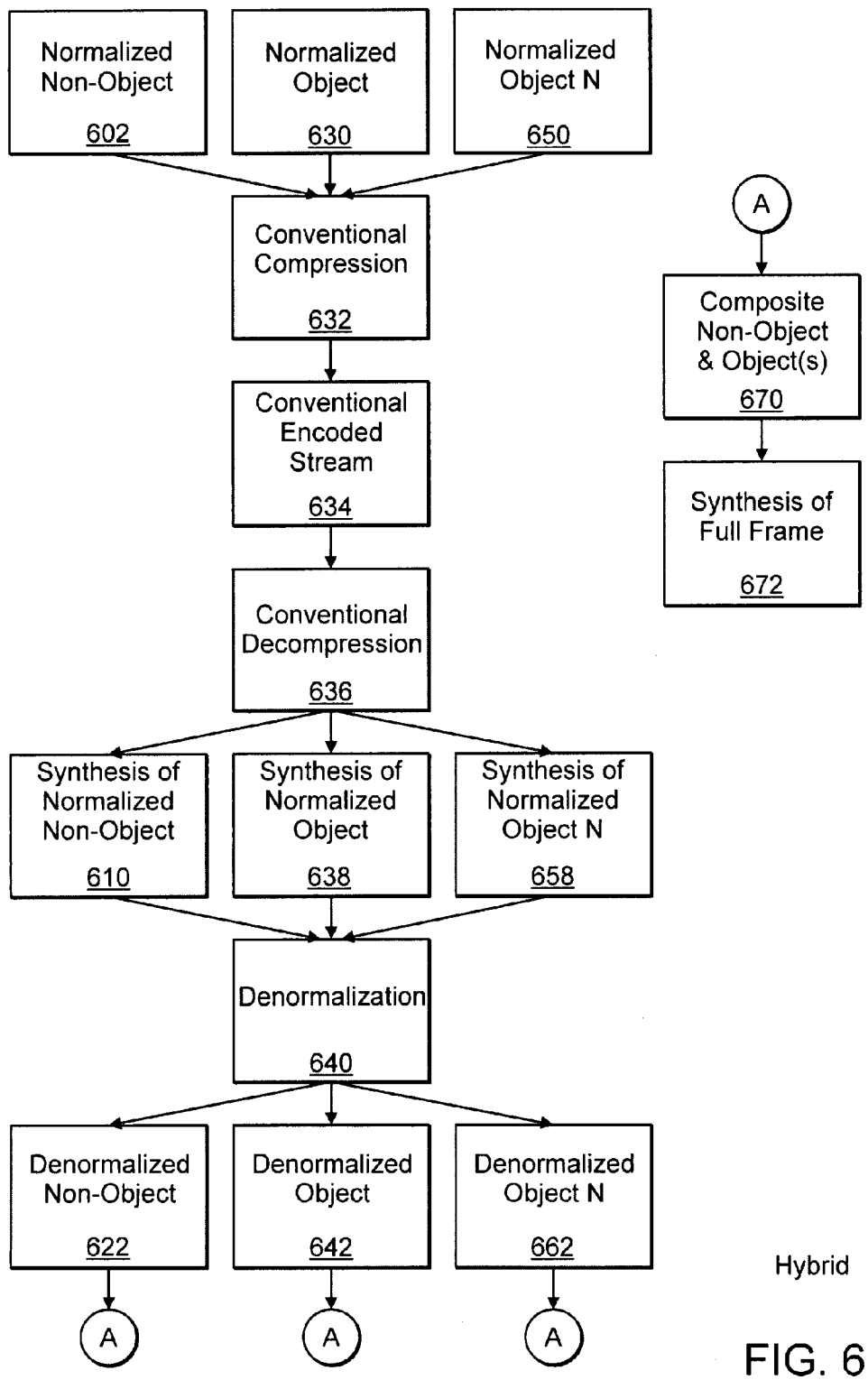
FIG. 6 is a block diagram illustrating the hybrid spatial normalization compression method.

As shown in FIG. 6, the previously detected object instances 206, 208 (FIG. 2) for one or more objects (630, 650), are each processed with a separate instance of a conventional video compression method (632). Additionally, the non-object (602) resulting from the segmentation (230) of the objects, is also compressed using conventional video compression (632). The result of each of these separate compression encodings (632) are separate conventional encoded streams (634) of pel data for each video stream respectively. At some point, possibly after transmission, these intermediate encoded streams (634) of pel data are decompressed (636) into a synthesis of the normalized non-object (610) and a multitude of normalized objects (638, 658). These synthesized pels can be de-normalized (640) into their respective de-normalized versions (622, 642, 662) to correctly position the pels spatially relative to each other so that a compositing process (670) can combine the object and non-object pels into a synthesis of the full frame (672).

In a preferred embodiment, the switching between encoding modes is performed based on a statistical distortion metric, such as PSNR, that would allow conventional versus the subspace method to encode the frames of video.

In another embodiment of the invention, the encoded parameters of the appearance, global deformation, and local deformation are interpolated to yield predictions of intermediate frames that would not otherwise have to be encoded. The interpolation method can be any of the standard interpolation methods such as linear, cubic, spline, etc.

Figure 14:
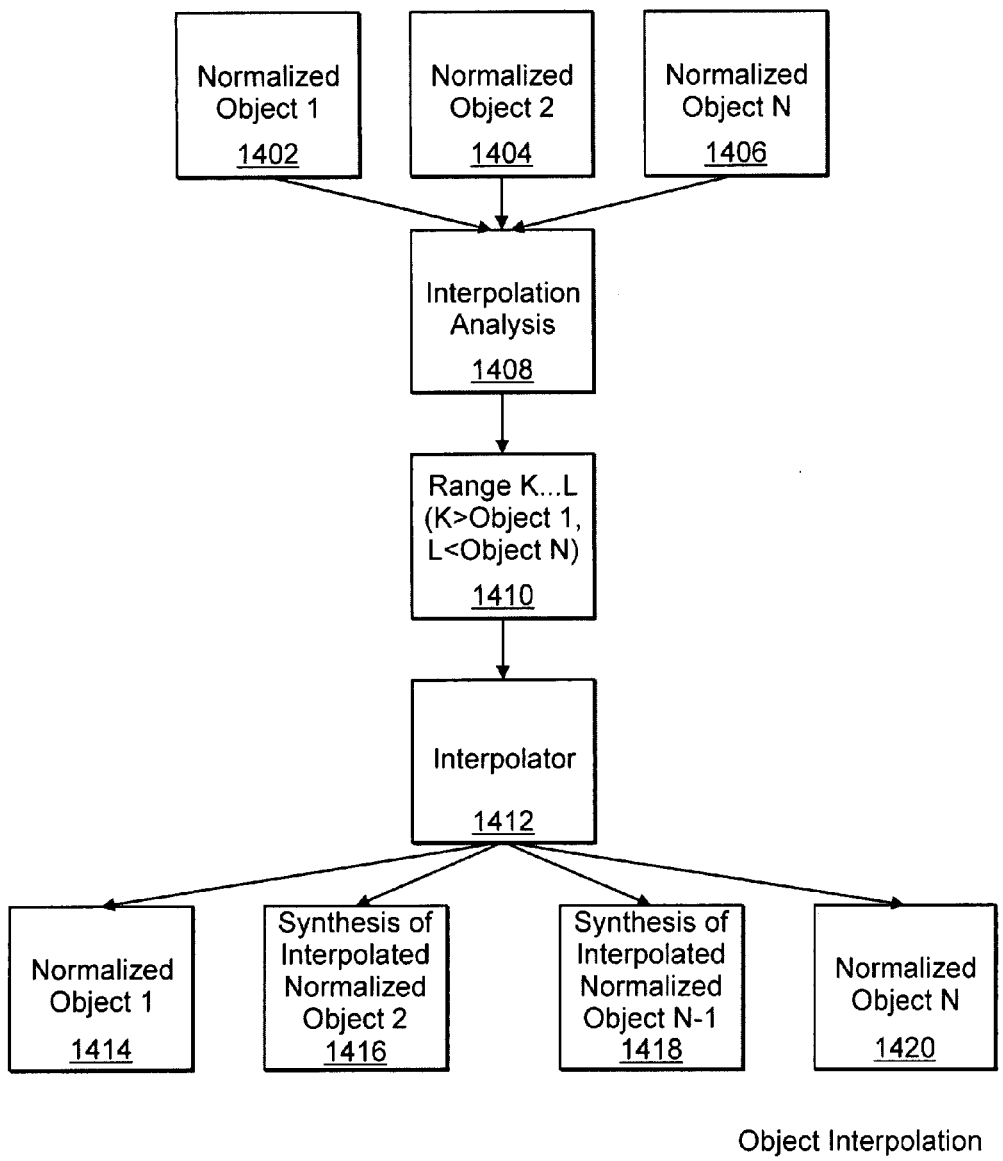
FIG. 14 is a block diagram illustrating the object interpolation method of the invention.

As shown in FIG. 14, the object interpolation method can be achieved through the interpolation analysis (1408) of a series of normalized objects (1402, 1404, 1406) as represented by appearance and deformation parameters. The analysis 1408 determines the temporal range (1410) over which an interpolating function 1412 can be applied. The range specification (1410) can then be combined with the normalized object specifications (1414, 1420) in order to approximate and ultimately synthesize the interim normalized objects (1416, 1418).

Other embodiments are envisioned.

Integration of Hybrid Codec

In combining a conventional block-based compression algorithm and a normalization-segmentation scheme, as described in the present invention, there are several inventive methods that have resulted. Primarily, there are specialized data structures and communication protocols that are required.

The primary data structures include global spatial deformation parameters and object segmentation specification masks. The primary communication protocols are layers that include the transmission of the global spatial deformation parameters and object segmentation specification masks.

Progressive Computational Environment

According to the foregoing, a certain embodiment of object-based encoding and processing of video data of the present invention is as follows. A video stream formed of a plurality or sequence of video frames 202,204 is fed as input to the invention system as shown in FIG. 2. An object detector 206,208 detects at least one object in (across) the two or more video frames 202,204. Tracking module 220 identifies and tracks the detected object over the multiple frames 202,204.

The video stream is also analyzed by a structural model generator. The structural model generator analyzes the video stream in terms of bandwidth consumption, structure and motion. Several structural models are generated. Structural models that are capable of further reduction are enhanced to include motion, deformation and illumination modeling.

The structural models are used to classify spatial regions of the video frames 202,204 as belonging to one model or another. The model assignment effectively implies a spatial segmentation of the video stream. This is illustrated in FIG. 2 as segmenter 230 segmenting (spatially and/or temporally) pel data corresponding to the detected object from other pel data in the two or more video frames 202,204. Object pel data 232,234 result.

Correspondence modeler 224 identifies elements (features) of the detected object in one video frame 202 and identifies the respective corresponding element 222 of the detected object in the second video frame 204. Next, correspondence modeler 224 analyzes the identified corresponding elements 222 and determines relationships between the respective corresponding elements. The analysis preferably employs an appearance-based motion estimation between the video frames 202,204. The determined relationships define a working correspondence model 224. Preferably a robust estimation of a multi-dimensional projective motion model (for global motion and global registration discussed above in FIG. 4) is used to generate correspondence models 224.

Further the invention system integrates the determined relationships between the corresponding elements to form a model of global motion of the detected object. Preferably this is performed as part of normalization (resampling) process 240. Normalization process 240 factors out spatial regions of the video frames 202,204 that have any variation associated with global structure, local deformation, global motion and pose and illumination. The remaining variation is considered to be the "appearance" of the detected object. It is noted that multiple normalization planes are used to model the appearance.

The normalization appearance of the detected object exhibits highly linear characteristics when modeled using optimal linear techniques. These appearance models are generated using adaptive, sequential and "generalized" PCA (discussed above) that yields a highly compact encoding of the object appearance. Preferably this processing is performed within a Wavelet computational environment; such allows any complex object models (i.e. structural model, appearance model, motion model of the detected object) to be processed in a manner similar to conventional video compression.

Known techniques for estimating structure from motion are employed and are combined with motion estimation to determine candidate structures for the structural parts (detected object of the video frame 202,204 over time). This results in defining the position and orientation of the detected object in space and hence provides a structural model and a motion model.

The appearance model then represents characteristics and aspects of the detected object which are not collectively modeled by the structural model and the motion model. In one embodiment, the appearance model is a linear decomposition of structural changes over time and is defined by removing global motion and local deformation from the structural model. Applicant takes object appearance at each video frame, and using the structural model, reprojects to a "normalized pose." The "normalized pose" will also be referred to as one or more "cardinal" poses. The reprojection represents a normalized version of the object and produces any variation in appearance. As the given object rotates or is spatially translated between video frames 202,204 the appearance is positioned in a single cardinal pose (i.e., the average normalized representation). The appearance model also accounts for cardinal deformation of a cardinal pose (e.g., eyes opened/closed, mouth opened/closed, etc.) Thus appearance model $AM(\sigma)$ is represented by cardinal pose $P_c$ and cardinal deformation $\Delta_c$ in cardinal pose $P_c$, $$AM(\sigma) = \sum_t (P_c + \Delta_c P_c)$$

Further, with regard to appearance and illumination modeling, one of the persistent challenges in image processing has been tracking objects under varying lighting conditions. In image processing, contrast normalization is a process that models the changes of pixel intensity values as attributable to changes in lighting/illumination rather than it being attributable to other factors (e.g. motion-global or local). The preferred embodiment estimates a detected object's arbitrary changes in illumination conditions under which the video was captured (i.e., modeling illumination incident on the object). This is achieved by combining principles from Lambertian Reflectance Linear Subspace (LRLS) theory with optical flow. According to the LRLS theory, when an object is fixed—preferably, only allowing for illumination changes, the set of the reflectance images can be approximated by a linear combination of the first nine spherical harmonics; thus the image lies close to a 9D linear subspace in an ambient "image" vector space. In addition, the reflectance intensity I for an image pixel (x,y) can be approximated as follows.

$$I(x, y) = \sum_{i=0,1,2} \sum_{j=-i,-i+1...i-1,i} l_{ij} b_{ij}(n),$$

Using LRLS and optical flow, expectations are computed to determine how lighting interacts with the object. These expectations serve to constrain the possible object motion that can explain changes in the optical flow field. When using LRLS to describe the appearance of the object using illumination modeling, it is still necessary to allow an appearance model to handle any appearance changes that may fall outside of the illumination model's predictions.

The combination of the structural model, motion (deformation) model, illumination model and appearance model are referred to collectively as the "object model". When object models necessary to decode a sequence of video frames are not available on the "receiver" side of a transmission, the appearance modeling falls back to performing a Wavelet encoding of the video stream. Meanwhile, the sender and the receiver build finite-state models of the object models implied by the Wavelet encoding of the video stream. This allow for the prediction of object models from the video stream and opportunistic application of the object-based compression as the video stream progresses.

With regard to the motion (deformation) model, estimating motion is typically both a source of computational inefficiency and a bias of the derived computation. In a certain embodiment, motion estimates are constrained by the motion (deformation), structural and illumination models. This results in increased computational efficiency and accuracy. An LRLS tracker is employed to determine object pose/position changes for each video frame 202,204 as predictions to the 2D (mesh) motion estimation. An inverse-compositional algorithm is applied to LRLS to predict motion of all pells through pose estimates.

Further, applicant extends wavelet processing from the analysis of a sequence of images to sequences of other spatial fields/vectors. A wavelet representation enables a partial processing to increase the computational efficiency. For appearance modeling, the wavelet processing is extended in the invention encoder to handle the coding of the appearance model basis vectors. The process biases pels in the appearance model based on distance and angle of incidence to the source camera projection axis. Next motion estimation is used to determine a "structure" for some part of the video frame 202. The process tracks that structure over time which enables a prediction of motion of all pels by implication from a pose, motion and deformation estimates. Hence, further motion estimation is initialized. Preferably this structure is tracked by the above described LRLS tracker.

In one preferred embodiment the deformation (motion) modeling and illumination modeling are performed within the wavelet processing. Compressive sampling is combined with illumination modeling. Illumination modeling is used to define sparse sampling spaces and to terminate the sampling process when an optimizing threshold is reached. Current data samples are used to predict a higher fidelity image.

The persistence of object models over scenes of a video, separate video files, and over a network of receiver nodes presents further opportunity for leveraging the capabilities of the empirically derived object models. The management of these object models, in terms of consolidation of similar models, re-targeting of object models, identification of complex topological relationships, versioning, indexing, and storage of the models provides a rich environment for even greater increases in both compression and computational efficiency.

For example, when PCA is applied to video data, the encoding of the data can be quite compact due to the empirical nature of the analysis. This empirical aspect also causes the "model" used to decode the data to become quite large thereby "shifting" the data storage from the encoded data to the empirical model. Through sequential resolution of these models, prediction algorithms are able to generate the empirical models without explicitly transmitting them.

Further, generating object models empirically from a video stream is difficult when the goal is to explicitly generate highly accurate models of the structure, deformation, pose, motion and illumination of the objects occurring in the video frames. On the other hand, generating implicit models with these same analytical techniques yields a highly efficient Object-based Compression algorithm as long as the end goal is constrained to the synthesis of the original video stream.

Object-based compression is expected to function most optimally when few, often one, object is present in the video data and explicit models of the object and background are available. By using a probabilistic formulation of the implicit modeling of objects in a Wavelet computational environment, the present invention can "degrade" to an encoding level that is very competitive with convention compression.

Lastly, many video processing systems attempt to take advantage of the capturing camera's calibration geometry in order to "interpret" the captured video data. In contrast, implicitly modeling the geometry of a virtual camera based on the video stream itself yields even greater gains in the "interpretive" capabilities of the compression algorithm. The invention compression system and methods are able to filter a significant amount of the captured data and also able to "predict" the sampling of data at a spatial and temporal resolution that are not provided by the "raw" camera capture capabilities.

Feature-Based Compression

In yet other improved embodiments, a "dense" object model is combined with a probablistic formulation. This combination yields a compromise between the use of a very high fidelity model (where residual errors are transmitted anyway and the range of the residuals is not significantly changed by increasing fidelity beyond a certain point) and the use of estimates (e.g. global registration and motion) obtained from above discussed correspondence and object modeling (which are often noisy and needlessly require a large number of processing bits).

Briefly, the object model obtained from the above discussed modeling algorithm is filtered so as to remove the high frequency noise. This filtering is done in three dimensions (i.e. 2 dimensional mesh-spatial planes and global motion plane) by fitting planes through the data points. This is a clustering approach that reduces the unwanted variations in the object model. The texture is mapped to these planes and the error computed. As new video frames come in, the error may start to increase since the planar model is not at a sufficient resolution to represent the new video. At this stage, the number of planes is changed adaptively. This can be done in a closed loop until the error falls below a threshold. Thus the object model is improved incrementally but only when necessary. This provides in an implicit way, a tradeoff between transmission bit-rate and distortion in the reconstruction of the video image.

The overall approach is to generate a low-resolution object model (e.g. correspondence and global motion model) and then refine it sequentially. The block diagram of FIG. 15 describes the process. A Tracking and Shape Estimation 1501 receives subject video data (e.g. video frames 202,204). Image objects of interest are identified as previously described. The feature points of detected objects are tracked over a few frames and a rough object model (correspondence and global motion) 1510 is built. In one embodiment, this three dimensional model 1510 is built using the above described factorization approach for 3D (spatial and motion) modeling of rigid objects.

Tracking and shape estimation module 1501 outputs rough object model 1510 to a planar approximator 1503. Since the rough model 1510 is usually not very accurate, planar approximator 1503 approximates an object model using a number of planes. The number of planes is obtained from adaptation unit 1507. For the planar approximation, a clustering of the object model, represented as a deformable mesh model, is done first. A 3D plane is then drawn through each cluster center. This produces an approximation of the subject object model.

In response, error unit 1505 computes a Reprojection Error. First error unit 1505 maps texture to the planar approximation. The texture-mapped planar approximation is then projected onto the image plane, and the error 1508 with respect to the original image is computed. Based on the reprojection error 1508, a decision is taken on whether to increase the number of planes required for representing the object model. If it is decided to increase the number of planes, an increment rule is initiated (e.g. increase by N), by adaptation unit 1507.

The final output is an improved object model at a desired fidelity. The Reprojection Error Computation 1505 can be replaced with an application specific module that is based upon the requirements of the particular application. For example, in a communication application, it can be based upon the number of bits necessary for efficiently representing the data.

Accordingly improved embodiments of the present invention provide the following:

1. A 3D modeling approach that can obtain a working object model at different resolutions based upon the requirements of the application or the user.

2. While most methods try to get the best possible object model from the source video data, applicants refine the object model incrementally and adaptively. This is much less computationally intensive than an accurate object modeling procedure.

3. The invention method does not require prior knowledge of the image object and can be used for an entire object, a macroblock, or the entire scene.

4. The computation of reprojection error can be replaced with other measures based on the application without affecting the other steps of the invention (FIG. 15) process.

5. Application specific criteria can be incorporated to decide the number of planes for the object model, which is also a stopping criterion.

6. The process automatically builds in noise resilience through the clustering process.

Figure 10:
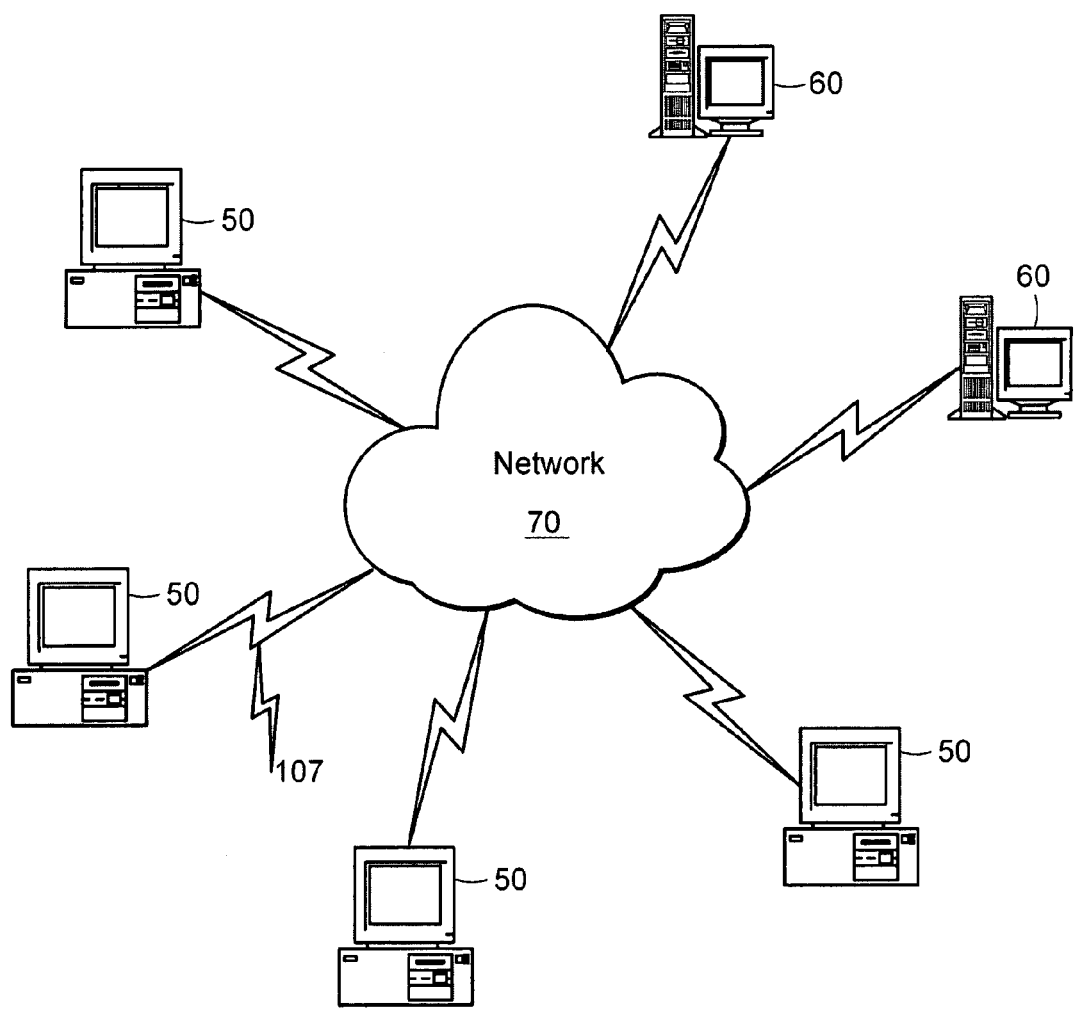
FIG. 10 is a schematic diagram of a computer environment in which embodiments of the present invention operate.

FIG. 10 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
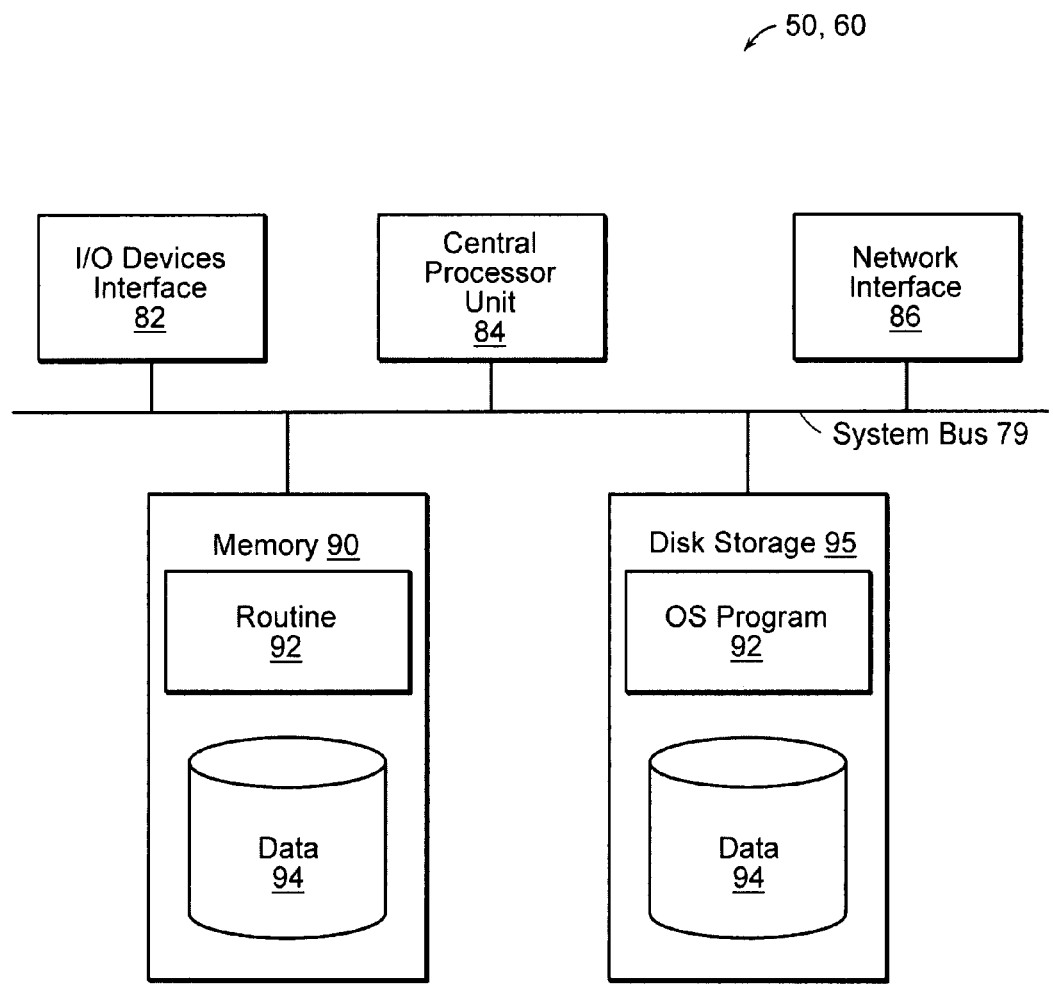
FIG. 11 is a block diagram of a computer in the network of FIG. 10.

FIG. 11 is a diagram of the internal structure of a computer (e.g., client processor/device 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 10). Memory 90 provides volatile storage for computer software instructions 92 and data 94 used to implement an embodiment of the present invention (e.g., linear decomposition, spatial segmentation, spatial/deformable mesh normalization and other object based encoding processing of FIG. 2 and other figures detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, different computer architectures are suitable. The foregoing computer network and system components are for purposes of illustration and not limitation.

What is claimed is:

1. A computer-implemented method for processing video signal data from a plurality of video frames, the method comprising: using the computer to perform the following steps detecting an object in two or more given video frames, each video frame being formed of pel data;

tracking the detected object through the two or more video frames;

segmenting pel data corresponding to the detected object from other pel data in the two or more video frames so as to generate a first intermediate form of the video signal data, the segmenting utilizing a spatial segmentation of the pel data;

generating correspondence models of elements of the detected object, each correspondence model relating an element of the detected object in one video frame to a corresponding element of the detected object in another video frame; and using the correspondence models, normalizing the segmented pel data, said normalizing including modeling global motion of the detected object and resulting in re-sampled pel data corresponding to the detected object in the two or more video frames, the re-sampled pel data providing an object-based encoded form of the video signal data normalized as output;

the object-based encoded form being able to be decoded by: (i) restoring spatial positions of the re-sampled pel data by utilizing the correspondence models, thereby generating restored pels corresponding to the detected object; and (ii) recombining the restored pel data together with the other pel data in the first intermediate form of the video signal data to re-create an original video frame; and wherein generating correspondence models includes estimating a multi-dimensional projective motion model.

2. A method as claimed in claim 1 wherein the step of generating correspondence models includes:

identifying corresponding elements of the detected object in the given two or more video frames;

analyzing the corresponding elements to generate relationships between the corresponding elements; and forming the correspondence models by using the generated relationship between the corresponding elements;

wherein analyzing the corresponding elements comprises using an appearance-based motion estimation between two or more of the video frames.

3. A method as claimed in claim 2 wherein the modeling global motion includes integrating the generated relationships between the corresponding elements into a model of global motion.

4. A method as claimed in claim 1 wherein the detecting and tracking comprise using a face detection algorithm.

5. The method of claim 1 further comprising compressing the resampled pel data, the compressing including:

decomposing the re-sampled pel data into an encoded representation, truncating zero or more bytes of the encoded representation; and recomposing the re-sampled pel data from the truncated encoded representation;

wherein each of the decomposing and the recomposing uses Principal Component Analysis.

6. The method of claim 1 further comprising factoring the correspondence models into global deformation models, including:

integrating relationships between the corresponding elements into a model of global motion;

decomposing the re-sampled pel data into an encoded representation;

truncating zero or more bytes of the encoded representation; and recomposing the re-sampled pel data from the truncated encoded representation;

wherein each of the decomposing and the recomposing uses Principal Component Analysis; and wherein generating correspondence models includes analyzing the corresponding elements using a sampling population based on finite differences generated from a block-based motion estimation between two or more of the video frames.

7. The method of claim 6 wherein each of the two or more video frames have object pels and non-object pels, the method further comprising:

identifying corresponding elements in the non-object pels in two or more of the video frames;

analyzing the corresponding elements in the non-object pels and generating relationships between the corresponding elements in the non-object pels; and forming second correspondence models by using the generated relationships between the corresponding elements in the non-object pels;

wherein the step of analyzing the corresponding elements in the non-object pels employs a time-based occlusion filter.

8. The method of claim 1 further comprising:

factoring the correspondence models into global deformation models;

integrating relationships between the corresponding elements into a model of global motion;

decomposing the re-sampled pel data into an encoded representation, truncating zero or more bytes of the encoded representation; and recomposing the re-sampled pel data from the truncated encoded representation;

wherein each of the decomposing and the recomposing uses a conventional video compression/decompression process; and wherein generating correspondence models includes analyzing the corresponding elements using a sampling population based on finite differences generated from a block-based motion estimation between two or more of the video frames.

9. The method of claim 1 wherein the step of normalizing factors the correspondence models into local deformation models by:

defining a two dimensional mesh overlying pel data corresponding to the detected object, the mesh being based on a regular grid of vertices and edges; and creating a model of local motion from relationships between the corresponding elements, the relationships comprising vertex displacements based on finite differences generated from a block-based motion estimation between two or more of the video frames.

10. The method of claim 9 wherein the vertices correspond to discrete image features, the step of defining a two dimensional mesh further identifies significant image features corresponding to the detected object based on image intensity gradient of the object in the video frames.

11. The method of claim 9 wherein the created local motion model is based on a residual motion not approximated by a global motion model.

12. A computer-implemented method of generating an encoded form of video signal data from a plurality of video frames, the method comprising: using the computer to perform the following steps detecting an object in two or more video frames of the plurality of video frames, each video frame being formed of pel data;

tracking the detected object through the two or more video frames, the detected object having one or more elements;

for an element of the detected object in one video frame, identifying a corresponding element of the detected object in the other video frames;

analyzing the corresponding elements to generate relationships between the corresponding elements;

forming correspondence models for the detected object by using the generated relationships between the corresponding elements;

normalizing pel data corresponding to the detected object in the two or more video frames by utilizing the formed correspondence models and a deformable mesh, said normalizing generating re-sampled pel data representing an object-based encoded form of the video signal data; and rendering the object-based encoded form of the video signal data for subsequent use, the object-based encoded form enabling restoring of spatial positions of the re-sampled pel data by utilizing the correspondence models, and generating restored pel data of the detected object;

wherein the detecting and tracking comprise using any one or combination of a Viola/Jones face detection algorithm and Principle Component Analysis.

13. The method of claim 12 further comprising:

segmenting the pel data corresponding to the detected object from other pel data in the two or more video frames resulting in a first intermediate form of the video signal data, the segmenting utilizing temporal integration; and the object-based encoded form further enabling recombining of the restored pel data together with a portion of the first intermediate form of the video signal data to re-create an original video frame.

14. The method of claim 12 further comprising the step of factoring the correspondence models into global models by:

integrating the generated relationships between the corresponding elements into a model of global motion;

wherein the step of forming correspondence models uses a robust sampling consensus for solving a two dimensional affine motion model, and the step of analyzing the corresponding elements uses a sampling population based on finite differences generated from a block-based motion estimation between two or more of the video frames.

15. The method of claim 12 further comprising compressing the resampled pel data by:

decomposing the re-sampled pel data into an encoded representation;

truncating zero or more bytes of the encoded representation; and recomposing the re-sampled pel data from the truncated encoded representation;

wherein each of the decomposing and the recomposing uses Principal Component Analysis.

16. The method of claim 12 further comprising factoring the correspondence models into global deformation models by:

integrating the generated relationships between the corresponding elements into a model of global motion;

decomposing the re-sampled pel data into an encoded representation, truncating zero or more bytes of the encoded representation; and recomposing the re-sampled pel data from the truncated encoded representation;

wherein each of the decomposing and the recomposing uses Principal Component Analysis;

the step of forming correspondence models uses a robust sampling consensus for solving a two dimensional affine motion model, and the step of analyzing the corresponding elements uses a sampling population based on finite differences generated from a block-based motion estimation between two or more of the video frames.

17. The method of claim 16 wherein each of the two or more video frames comprises object pel data and non-object pel data, the method further comprising:

identifying corresponding elements in the non-object pel data in two or more of the video frames;

analyzing the corresponding elements in the non-object pel data to generate relationships between the corresponding elements in the non-object pel data;

generating second correspondence models by using the relationships between the corresponding elements in the non-object pel data;

wherein the analyzing of the corresponding elements in the non-object pel data includes a time-based occlusion filter.

18. The method of claim 12 further comprising:

factoring the correspondence models into global deformation models;

integrating the relationships between the corresponding elements into a model of global motion;

decomposing the re-sampled pel data into an encoded representation, truncating zero or more bytes of the encoded representation; and recomposing the re-sampled pel data from the truncated encoded representation;

wherein each of the decomposing and the recomposing uses a conventional video compression/decompression process;

wherein forming correspondence models uses a robust sampling consensus for solving a two dimensional affine motion model, and wherein analyzing the corresponding elements uses a sampling population based on finite differences generated from a block-based motion estimation between two or more of the video frames.

19. The method of claim 12 further comprising factoring the correspondence models into local deformation models including:

defining a two dimensional mesh overlying pels corresponding to the detected object, the mesh being based on a regular grid of vertices and edges, and;

generating a model of local motion from the relationships between the corresponding elements, the relationships comprising vertex displacements based on finite differences generated from a block-based motion estimation between two or more of the video frames.

20. The method of claim 19 wherein the vertices correspond to discrete image features, the method comprising identifying significant image features corresponding to the detected object by using an analysis of an image gradient Harris response.

21. The method of claim 19 wherein the generated local motion model is based on a residual motion not approximated by a global motion model.

* * * * *